United States Patent
Tatsuta et al.

(10) Patent No.: US 11,951,383 B2
(45) Date of Patent: Apr. 9, 2024

(54) CONTROLLING GAME PROCESSING USING DETERMINED ROTATIONAL DIRECTION IN COMBINATION WITH DETERMINED UP/DOWN DIRECTION

(71) Applicant: NINTENDO CO., LTD., Kyoto (JP)

(72) Inventors: Hideyuki Tatsuta, Kyoto (JP); Takafumi Masaoka, Kyoto (JP); Kazuhiro Yoshikawa, Kyoto (JP); Ryosuke Suzuki, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 17/941,359

(22) Filed: Sep. 9, 2022

(65) Prior Publication Data

US 2023/0256324 A1    Aug. 17, 2023

(30) Foreign Application Priority Data

Feb. 15, 2022   (JP) ................................. 2022-021341

(51) Int. Cl.
*A63F 13/24*   (2014.01)
*A63F 13/211*  (2014.01)
*A63F 13/428*  (2014.01)

(52) U.S. Cl.
CPC .......... *A63F 13/211* (2014.09); *A63F 13/428* (2014.09)

(58) Field of Classification Search
CPC .... A63F 13/211; A63F 13/428; A63F 13/812; A63F 13/573
See application file for complete search history.

(56) References Cited

U.S. PATENT DOCUMENTS

| | | |
|---|---|---|
| 2007/0213127 A1 | 9/2007 | Sato |
| 2010/0178988 A1 | 7/2010 | Izuno et al. |
| 2010/0245365 A1 | 9/2010 | Hato et al. |
| 2010/0248824 A1 | 9/2010 | Suzuki et al. |

(Continued)

FOREIGN PATENT DOCUMENTS

| | | |
|---|---|---|
| EP | 1 886 718 | 12/2019 |
| JP | 2007-243827 A | 9/2007 |

(Continued)

OTHER PUBLICATIONS

May 15, 2023 Search Report issued in European Patent Application No. 22214906.4, pp. 1-10.

*Primary Examiner* — David L Lewis
*Assistant Examiner* — Shauna-Kay Hall
(74) *Attorney, Agent, or Firm* — Nixon & Vanderhye P.C.

(57) ABSTRACT

Using output of an inertial sensor, whether an operation device is in a swing state of being swung is determined. Whether the operation device is rotated in a first direction about a predetermined axis of the inertial sensor or a second direction opposite to the first direction, is determined. Whether the operation device is swung in an upward direction or a downward direction is determined. First processing is executed in at least either a case where the operation device is rotated in the first direction about the predetermined axis or a case where the operation device is swung in the upward direction, during the swing state. Second processing is executed in at least either a case where the operation device is rotated in the second direction about the predetermined axis or a case where the operation device is swung in the downward direction, during the swing state.

20 Claims, 18 Drawing Sheets

(56) References Cited

U.S. PATENT DOCUMENTS

| | | | |
|---|---|---|---|
| 2017/0203211 A1* | 7/2017 | Kiryu | A61B 5/6895 |
| 2017/0348592 A1* | 12/2017 | Tanaka | A63F 13/428 |
| 2021/0038973 A1* | 2/2021 | Wada | G06F 3/0346 |

FOREIGN PATENT DOCUMENTS

| | | |
|---|---|---|
| JP | 2010-158463 A | 7/2010 |
| JP | 2017-217489 | 12/2017 |
| JP | 2019-126417 A | 8/2019 |

* cited by examiner

FIG. 7
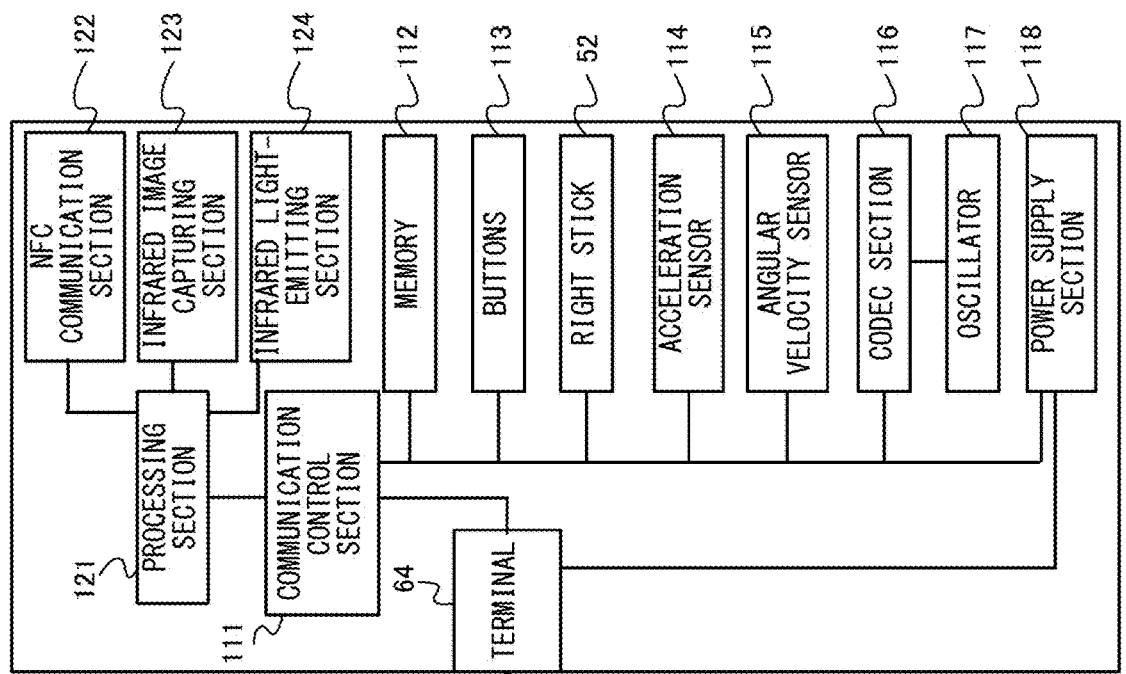
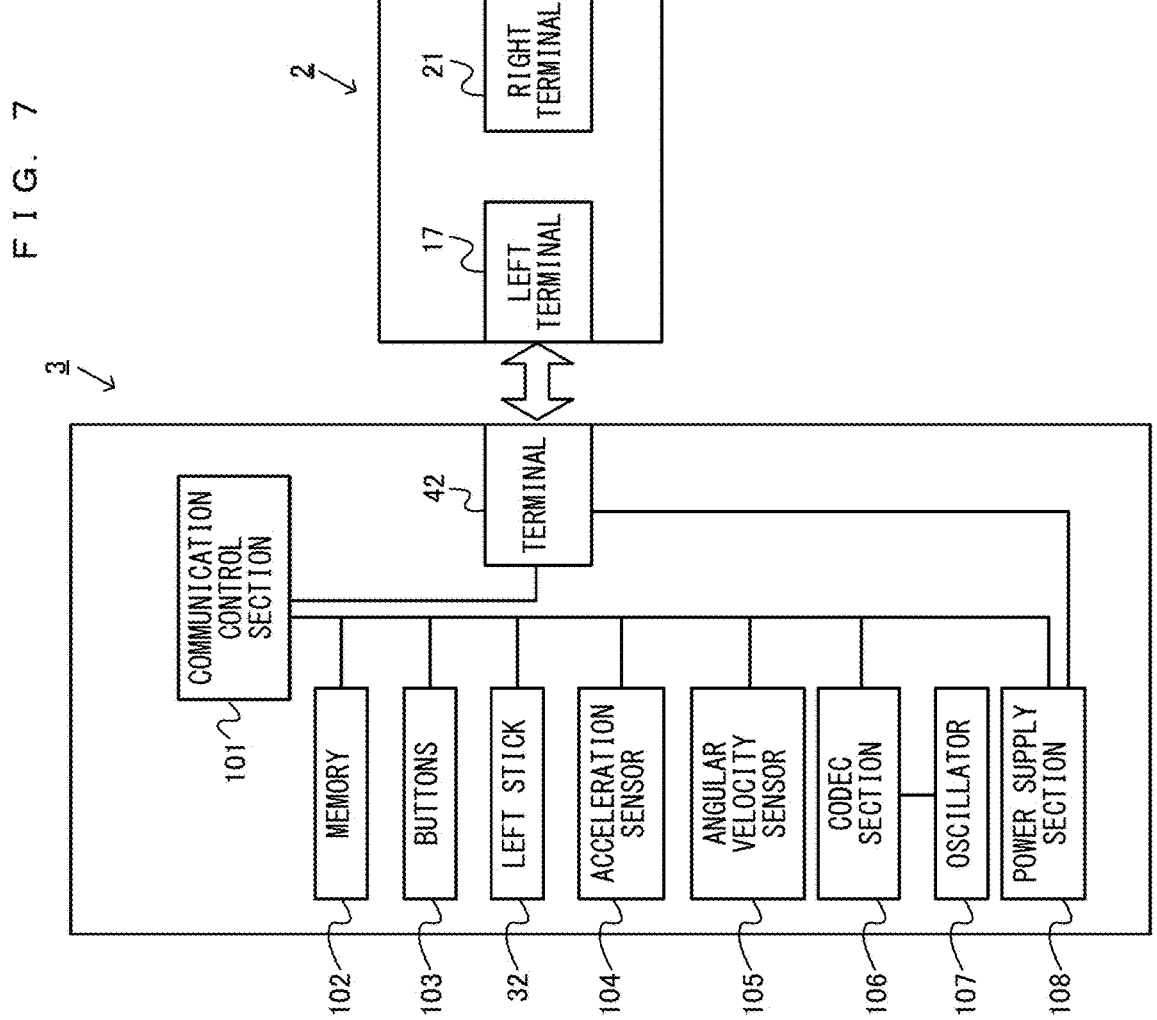

F I G. 1 6
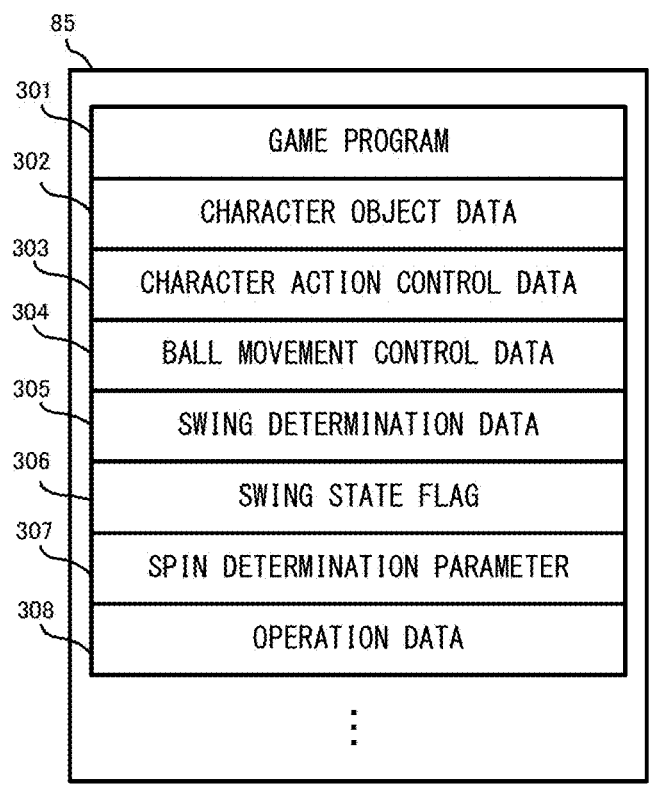

CONTROLLING GAME PROCESSING USING DETERMINED ROTATIONAL DIRECTION IN COMBINATION WITH DETERMINED UP/DOWN DIRECTION

CROSS REFERENCE TO RELATED APPLICATION

This application claims priority to Japanese Patent Application No. 2022-21341 filed on Feb. 15, 2022, the entire contents of which are incorporated herein by reference.

FIELD

The present disclosure relates to game processing using an input device having an inertial sensor.

BACKGROUND AND SUMMARY

Conventionally, there has been known a game in which an input is performed using an inertial sensor and a predetermined object is moved on the basis of an operation of swinging a controller having the inertial sensor.

In the above game, a swing operation is detected to move the predetermined object. That is, on the basis of an output of the inertial sensor, occurrence and finish of a swing operation are determined and the orientation of an input device during the swing operation is recognized, so that these are reflected in game processing.

In this regard, there is room for further improving accuracy of determination as to a swing operation so as to improve operability in game processing.

Accordingly, an object of the present disclosure is to provide a computer-readable non-transitory storage medium having an information processing program stored therein, an information processing apparatus, an information processing method, and an information processing system that can improve accuracy of determination as to a swing operation.

Configuration examples for achieving the above object will be shown below.

One configuration example is a computer-readable non-transitory storage medium having stored therein an information processing program to be executed by a computer of an information processing apparatus, the program causing the computer to execute the following processing. First, from an operation device having an inertial sensor, operation data including at least data based on an output of the inertial sensor is acquired. Next, whether or not the operation device is in a swing state in which the operation device is being swung is determined on the basis of the operation data. Further, whether the operation device is rotated in a first direction about a predetermined axis of the inertial sensor or a second direction opposite to the first direction, is determined on the basis of the operation data. In addition, whether the operation device is swung in an upward direction or a downward direction is also determined on the basis of the operation data. Then, first processing is executed in at least either a case where it is determined that the operation device is rotated in the first direction about the predetermined axis or a case where it is determined that the operation device is swung in the upward direction, during a period in which the operation device is in the swing state, on the basis of the operation data. Meanwhile, second processing is executed in at least either a case where it is determined that the operation device is rotated in the second direction about the predetermined axis or a case where it is determined that the operation device is swung in the downward direction, during a period in which the operation device is in the swing state, on the basis of the operation data.

According to the above configuration example, the operation content in the swing state is determined using two elements that are the rotation direction about the predetermined axis and the swing direction in the up/down direction. Thus, accuracy of determination as to a swing operation with a wrist twisted can be improved.

In another configuration example, the program may further cause the computer to: move a moving object in a virtual space on the basis of the first processing or the second processing; and execute game processing using the moving object.

According to the above configuration example, in a ball sport game in which a ball is hit, such as a tennis game, an operation of such swing as to impart spin to a ball is determined, and this can be reflected in a motion of a ball so as to be imparted with spin. Thus, amusement of the ball sport game can be improved.

In another configuration example, the program may cause the computer to: when moving the moving object on the basis of the first processing, move the moving object with a first change applied to a trajectory of the moving object; and when moving the moving object on the basis of the second processing, move the moving object with a second change applied to a trajectory of the moving object.

According to the above configuration example, it is possible to provide a game that allows a plurality of types of trajectories to be selectively used for the trajectory of the ball. For example, the trajectory of the ball not imparted with spin can be changed to a trajectory that will be made when topspin is imparted or a trajectory that will be made when backspin is imparted.

In another configuration example, the program may cause the computer to: execute processing of causing the character object to perform a first action with respect to the moving object, as the first processing; and execute processing of causing the character object to perform a second action with respect to the moving object, as the second processing.

According to the above configuration example, for example, a character object is caused to perform such an action as to swing a racket of tennis. At this time, for example, it is possible to perform different actions between a case of imparting topspin to the ball and a case of imparting backspin to the ball. This makes it easy for the player to determine what effect is imparted to the ball.

In another configuration example, the program may further cause the computer to: calculate an orientation of the operation device on the basis of the operation data; and determine whether the operation device is swung in the upward direction or the downward direction, on the basis of the calculated orientation of the operation device.

According to the above configuration example, since the swing direction is determined on the basis of orientation change in the operation device, more accurate determination can be performed.

In another configuration example, the program may further cause the computer to: calculate a rotation amount about the predetermined axis of the inertial sensor during the swing state, on the basis of the operation data; calculate an orientation change amount of the operation device during the swing state, on the basis of the operation data; and execute the first processing or the second processing on the basis of the rotation amount and the orientation change amount.

According to the above configuration example, the content of processing to be executed as the first processing or the second processing can be changed by the rotation amount about the predetermined axis and the orientation change amount.

In another configuration example, the program may cause the computer to: execute the first processing on the basis of a first parameter calculated by adding the rotation amount and the orientation change amount; and execute the second processing on the basis of a second parameter calculated by adding the rotation amount and the orientation change amount.

In another configuration example, the program may cause the computer to: for the first processing, calculate the first parameter with the orientation change amount adjusted so as to decrease; and for the second processing, calculate the second parameter with the orientation change amount adjusted so as to decrease.

According to the above configuration example, response to a swing operation, or the like, can be finely adjusted in accordance with the game content, whereby operability can be improved.

In another configuration example, the program may cause the computer to: if the rotation amount in the first direction exceeds a first threshold, determine that the operation device is rotated in the first direction; and if the rotation amount in the second direction exceeds a second threshold, determine that the operation device is rotated in the second direction.

According to the above configuration example, it is possible to refrain from executing the first or second processing in a case of such a motion that the rotation amount does not exceed a predetermined threshold.

In another configuration example, the program may cause the computer to: if it is determined that the operation device is swung in the upward direction and the orientation change amount exceeds a third threshold, execute the first processing; and if it is determined that the operation device is swung in the downward direction and the orientation change amount exceeds a fourth threshold, execute the second processing.

According to the above configuration example, it is possible to refrain from executing the first or second processing in a case of such a motion that the orientation change amount in the up/down direction does not exceed a predetermined threshold.

In another configuration example, the program may cause the computer to: acquire operation data including acceleration data; if a magnitude of an acceleration indicated by the acceleration data included in the acquired operation data exceeds a first threshold, determine that the swing state is started; and at a termination timing after the magnitude of the acceleration has reached a peak, determine that the swing state is finished.

According to the above configuration example, it is possible to appropriately determine a period from the start to the finish of the swing state.

In another configuration example, the program may further cause the computer to execute third processing if a condition for executing the first processing and a condition for executing the second processing have not been satisfied during the swing state, on the basis of the acquired operation data.

According to the above configuration example, a wider variety of operations can be performed by the player, whereby amusement of the game can be improved.

According to the exemplary embodiments, accuracy of determination for a swing operation can be improved.

BRIEF DESCRIPTION OF THE DRAWINGS

FIG. 7 is a block diagram showing non-limiting examples of the internal configurations of the main body apparatus 2, the left controller 3, and the right controller 4;

FIG. 16 is a memory map showing a non-limiting example of various data stored in a DRAM 85;

DETAILED DESCRIPTION OF NON-LIMITING EXAMPLE EMBODIMENTS

Hereinafter, one exemplary embodiment will be described.

A game system according to an example of the exemplary embodiment will be described below. An example of a game system 1 according to the exemplary embodiment includes a main body apparatus (an information processing apparatus, which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment will be described, and then, the control of the game system 1 according to the exemplary embodiment will be described.

Figure 1:
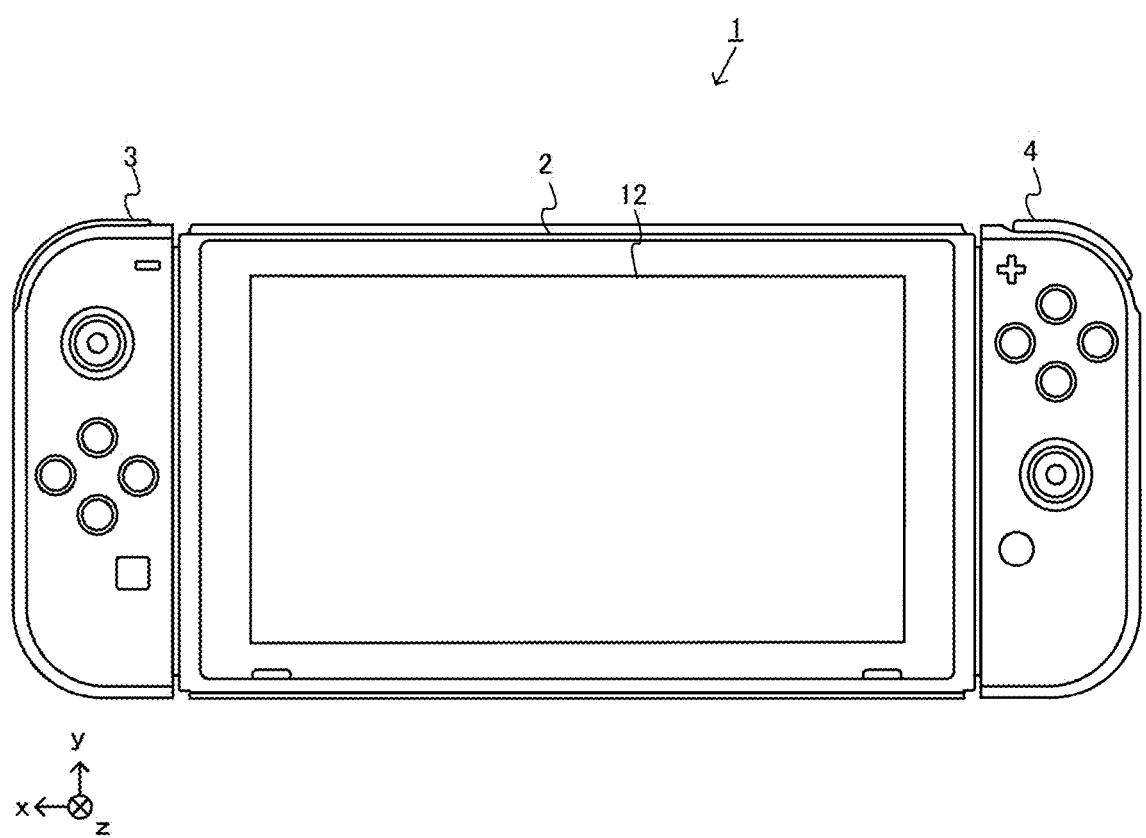
FIG. 1 shows a non-limiting example of a state in which a left controller 3 and a right controller 4 are attached to a main body apparatus 2.

FIG. 1 shows an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
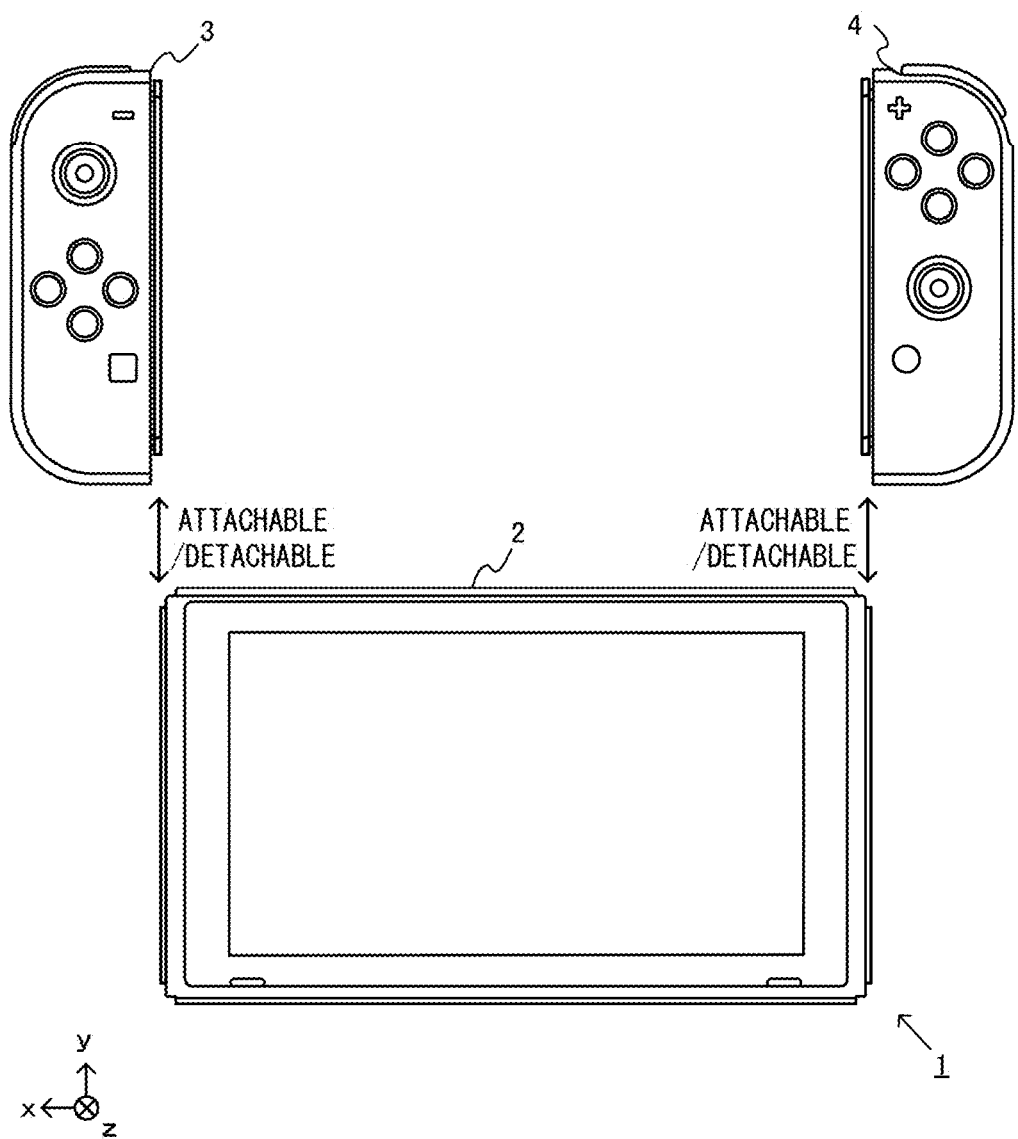
FIG. 2 shows a non-limiting example of a state in which the left controller 3 and the right controller 4 are detached from the main body apparatus 2.

FIG. 2 shows an example of the state where each of the left controller 3 and the right controller 4 is detached from the main body apparatus 2. As shown in FIGS. 1 and 2, the left controller 3 and the right controller 4 are attachable to and detachable from the main body apparatus 2. Hereinafter, the left controller 3 and the right controller 4 may be collectively referred to as "controller".

Figure 3:
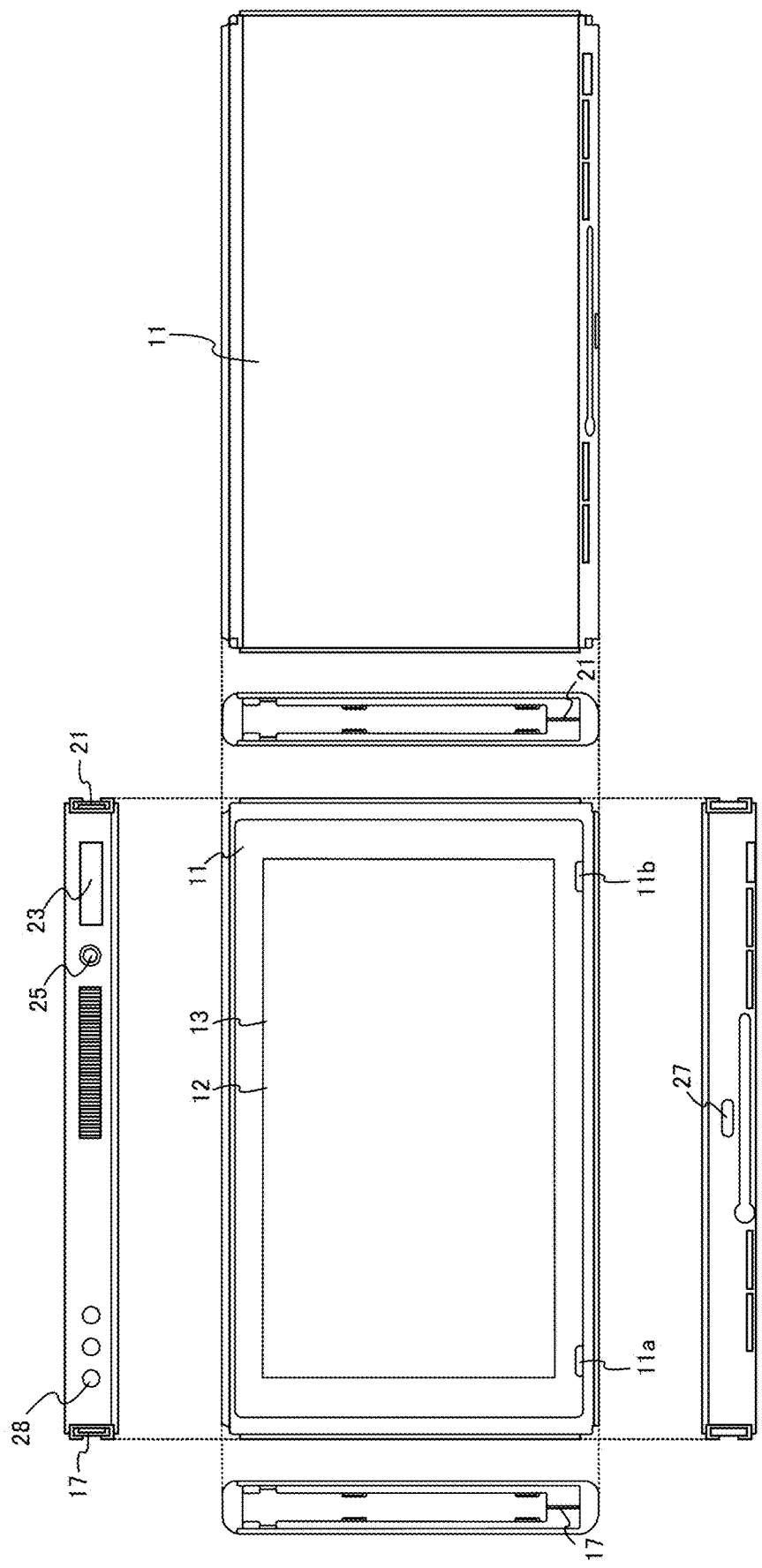
FIG. 3 is six orthogonal views showing a non-limiting example of the main body apparatus 2.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a substantially rectangular shape.

The shape and the size of the housing 11 are discretionary. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

The main body apparatus 2 includes a touch panel 13 on the screen of the display 12. In the exemplary embodiment, the touch panel 13 is of a type capable of receiving a multi-touch input (e.g., electrical capacitance type). However, the touch panel 13 may be of any type, and may be, for example, of a type capable of receiving a single-touch input (e.g., resistive film type).

The main body apparatus 2 includes speakers (i.e., speakers 88 shown in FIG. 6) within the housing 11. As shown in FIG. 3, speaker holes 11a and 11b are formed in the main surface of the housing 11. Then, sounds outputted from the speakers 88 are outputted through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided at an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and outputted from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
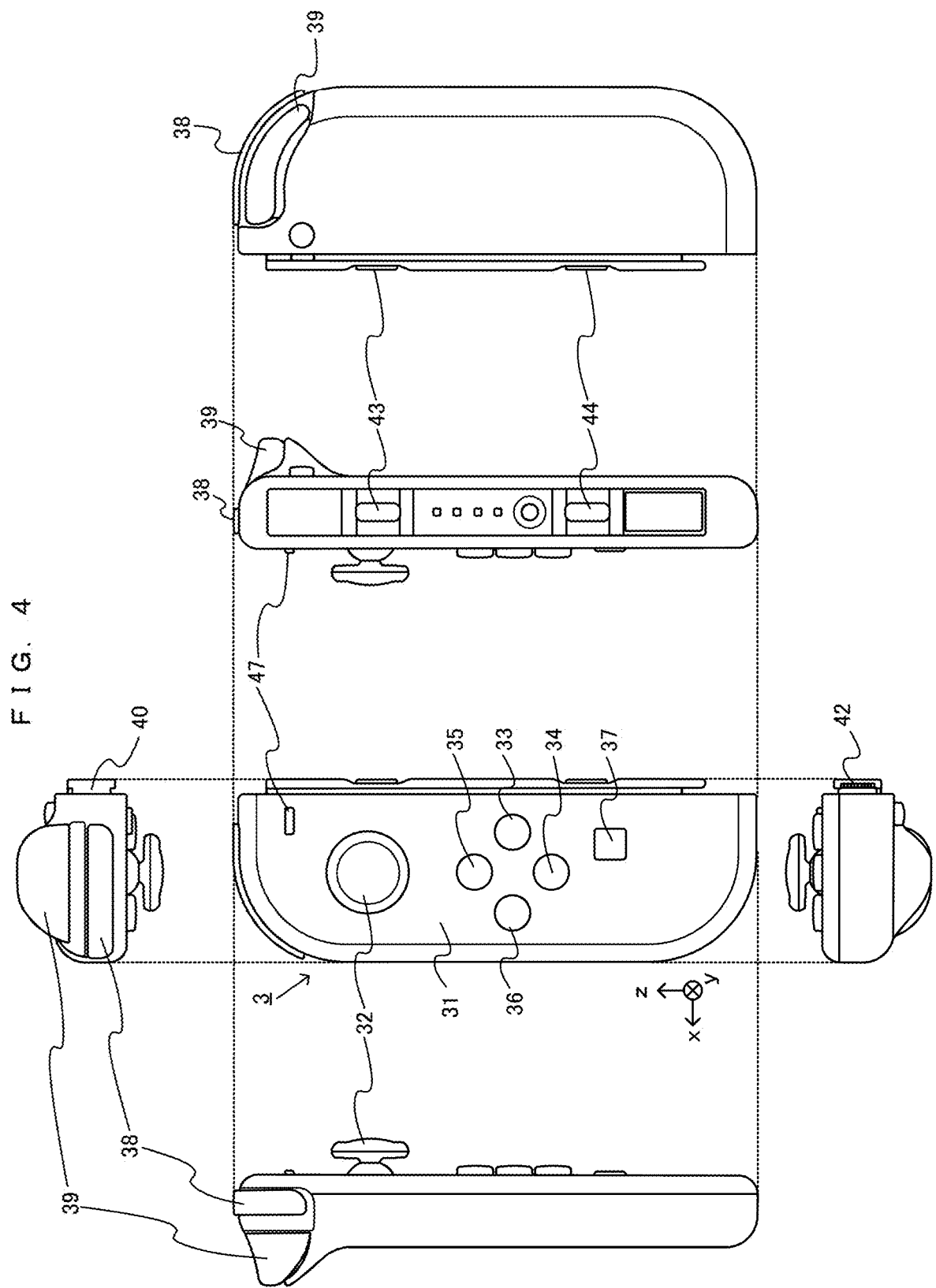
FIG. 4 is six orthogonal views showing a non-limiting example of the left controller 3.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction shown in FIG. 4 (i.e., a z-axis direction shown in FIG. 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly, the left hand. Further, the left controller 3 can also be held in the orientation in which the left controller 3 is horizontally long. When held in the orientation in which the left controller 3 is horizontally long, the left controller 3 may be held with both hands.

The left controller 3 includes a left analog stick (hereinafter, referred to as a "left stick") 32 as an example of a direction input device. As shown in FIG. 4, the left stick 32 is provided on a main surface of the housing 31. The left stick 32 can be used as a direction input section with which a direction can be inputted. The user tilts the left stick 32 and thereby can input a direction corresponding to the direction of the tilt (and input a magnitude corresponding to the angle of the tilt). The left controller 3 may include a directional pad, a slide stick that allows a slide input, or the like as the direction input section, instead of the analog stick. Further, in the exemplary embodiment, it is possible to provide an input by pressing the left stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "—" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
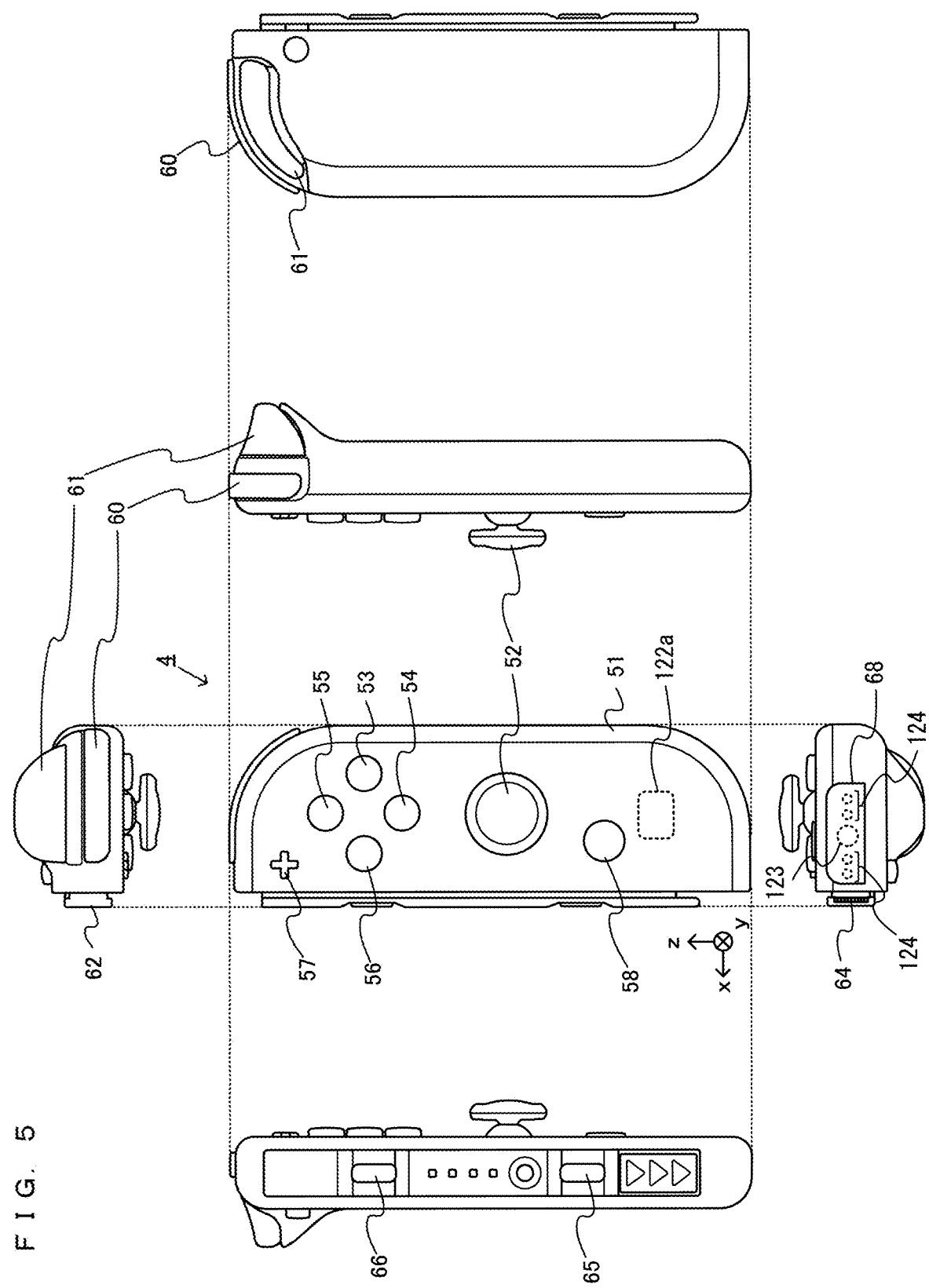
FIG. 5 is six orthogonal views showing a non-limiting example of the right controller 4.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction shown in FIG. 5 (i.e., the z-axis direction shown in FIG. 5). In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes a right analog stick (hereinafter, referred to as a "right stick") 52 as a direction input section. In the exemplary embodiment, the right stick 52 has the same configuration as that of the left stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
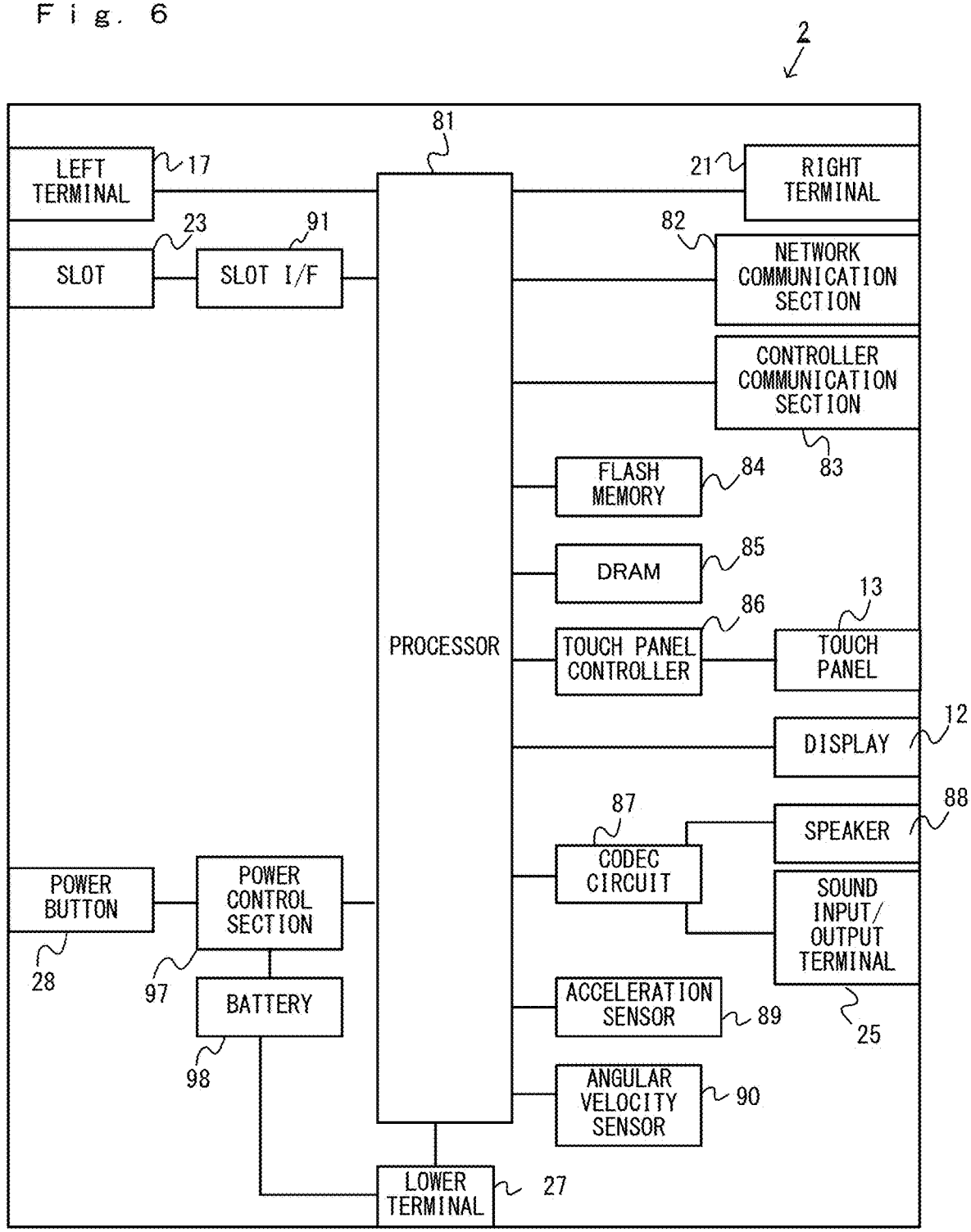
FIG. 6 is a block diagram showing a non-limiting example of the internal configuration of the main body apparatus 2.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and housed in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes the flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter, abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined method for communication (e.g., communication based on a unique protocol or infrared light communication). The wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2, and the left controller 3 and the right controller 4, is discretionary. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 includes a touch panel controller 86, which is a circuit for controlling the touch panel 13. The touch panel controller 86 is connected between the touch panel 13 and the processor 81. On the basis of a signal from the touch panel 13, the touch panel controller 86 generates data indicating the position at which a touch input has been performed, for example, and outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). On the basis of a command from the processor 81, the power control section 97 controls the supply of power from the battery 98 to the above components.

Further, the battery 98 is connected to the lower terminal 27. When an external charging device (e.g., the cradle) is connected to the lower terminal 27 and power is supplied to the main body apparatus 2 via the lower terminal 27, the battery 98 is charged with the supplied power.

FIG. 7 is a block diagram showing examples of the internal configurations of the main body apparatus 2, the left controller 3, and the right controller 4. The details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the left stick 32. Each of the buttons 103 and the left stick 32 outputs information regarding an operation performed on itself to the communication control section 101 repeatedly at appropriate timings.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., x, y, z axes shown in FIG. 4) directions. The acceleration sensor 104 may detect an acceleration along one axial direction or accelerations along two axial directions. In the exemplary embodiment, the angular velocity sensor 105 detects angular velocities about predetermined three axes (e.g., the x, y, z axes shown in FIG. 4). The angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are outputted to the communication control section 101 repeatedly at appropriate timings.

The communication control section 101 acquires information regarding an input (specifically, information regarding an operation or the detection result of the sensor) from each of input sections (specifically, the buttons 103, the left stick 32, and the sensors 104 and 105). The communication control section 101 transmits operation data including the acquired information (or information obtained by performing predetermined processing on the acquired information) to the main body apparatus 2. The operation data is transmitted repeatedly, once every predetermined time. The interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the left stick 32 on the basis of the operation data. Further, the main body apparatus 2 can calculate information regarding the motion and/or the orientation of the left controller 3 on the basis of the operation data (specifically, the detection results of the acceleration sensor 104 and the angular velocity sensor 105).

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the right stick 52, and inertial sensors (an acceleration sensor 114 and an angular velocity sensor 115). These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

[Outline of Game Processing in Exemplary Embodiment]

Next, the outline of operation of the game processing executed by the game system 1 according to the exemplary embodiment will be described. As described above, in the game system 1, the main body apparatus 2 is configured such that each of the left controller 3 and the right controller 4 is attachable thereto and detachable therefrom. In a case of playing the game with the left controller 3 and the right controller 4 attached to the main body apparatus 2, a game image is outputted to the display 12. In a case where the main body apparatus 2 alone with the left controller 3 and the right controller 4 detached therefrom is mounted on the cradle, the main body apparatus 2 can output a game image to a stationary monitor or the like via the cradle. In the exemplary embodiment, the case of playing the game in the latter manner will be described as an example. Specifically, the main body apparatus 2 alone with the left controller 3 and the right controller 4 detached therefrom is mounted on the cradle, and the main body apparatus 2 outputs a game image and the like to a stationary monitor or the like via the cradle. Here, it is assumed that a right-handed player plays the game with the right controller 4 held by the right hand. The left controller 3 is not used in the exemplary embodiment. However, for example, if the player is left-handed, the processing as described below may be performed using the left controller 3 instead of the right controller 4.

[Assumed Game]

The game assumed in the exemplary embodiment is a tennis game for players to compete in a virtual three-dimensional space. In the exemplary embodiment, as an example, a case of competing against a CPU character in a singles match will be described. As a matter of course, a player-versus-player mode in which another player operates an opponent is also applicable. In a case of the player-versus-player mode, two players may perform competitive play using one game apparatus, or may perform communication competition play by connecting two game apparatuses via a network. Instead of a singles match, a doubles match may be performed.

Figure 8:
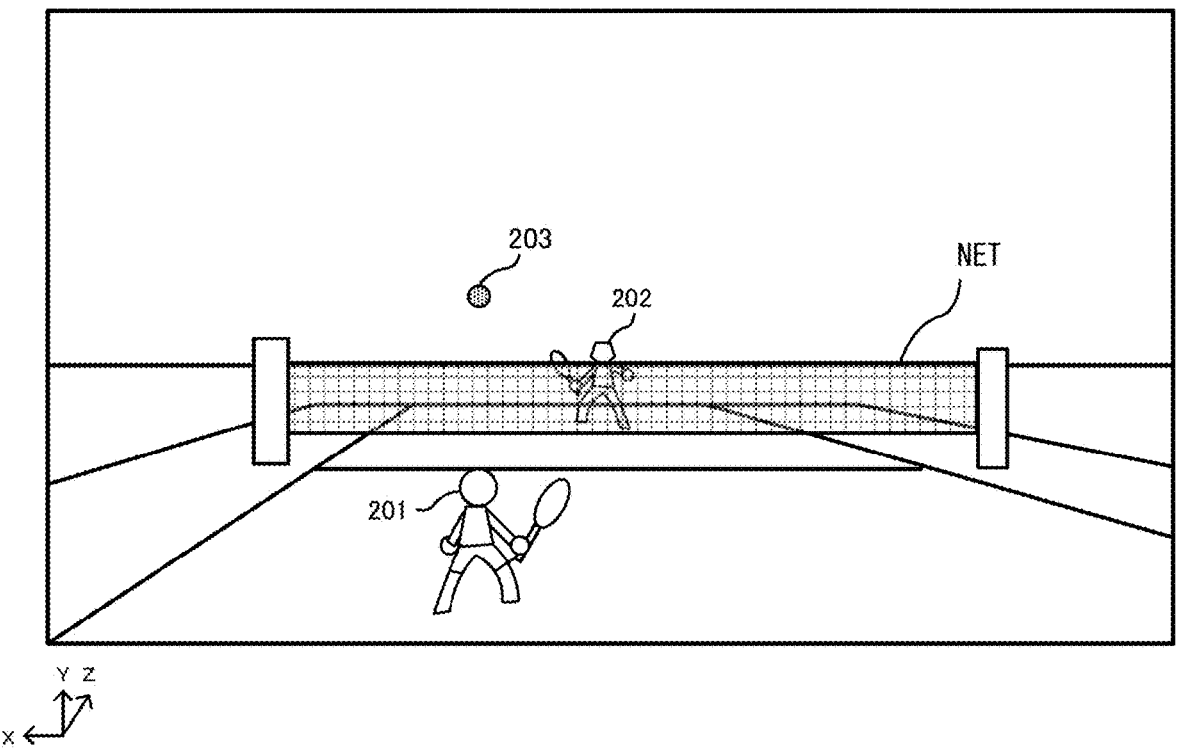
FIG. 8 shows a non-limiting example of a game screen according to the exemplary embodiment.

FIG. 8 shows an example of a game image of the tennis game according to the exemplary embodiment. The game image shown in FIG. 8 is an image obtained by a virtual camera imaging a three-dimensional virtual space (virtual tennis court). In the game image (in virtual tennis court), two character objects are displayed. On the near-side court (own-side court) of the virtual tennis court, a player character object (hereinafter, referred to as player character) 201 which is a player's operation target is placed. On the far-side court (opponent-side court) over the net, a character object (hereinafter, referred to as opponent character) 202 which is an opponent is placed. Each character object holds a tennis racket object (hereinafter, simply referred to as racket) with the right hand. Besides, in the game image, a tennis ball object (hereinafter, simply referred to as ball) 203 which is a moving object is also displayed.

Basic specifications and operation method of the tennis game according to the exemplary embodiment will be described. First, in this tennis game, the player swings the right controller 4 resembling a racket, whereby the player can cause the player character 201 to swing the racket in a direction corresponding to the swing direction. In the exemplary embodiment, it is assumed that the right controller 4 is swung while held in such a way that the surface having operation buttons resembles a racket face (surface for hitting a ball), as an example. Hereinafter, a motion of the player character 201 swinging the racket is referred to as racket swing motion. In this tennis game, movement of the player character 201 is automatically controlled. That is, in accordance with the movement trajectory (movement direction) of the ball 203, the player character 201 automatically moves in the own-side court toward such a position where the player character 201 can hit the ball 203 back (hereinafter, such movement is referred to as automatic movement). Therefore, in this game, the player only has to concentrate on an operation of swinging the right controller 4 in accordance with a timing when the ball 203 has come, without considering a movement operation.

In actual tennis, there is known a technique for imparting rotation to a tennis ball when hitting the ball back, like so-called topspin and backspin. In the processing according to the exemplary embodiment, such an element of imparting rotation to a tennis ball is introduced into an operation in the tennis game described above.

Specifically, in the exemplary embodiment, the following processing is performed. First, the twist degree of the wrist of a hand holding the right controller 4 is calculated. Further, whether the way of swinging the right controller 4 is swing-up or swing-down down is determined. Then, on the basis of these two elements, the movement of the ball 203 is controlled in such a way that topspin or backspin is imparted.

Figure 9:
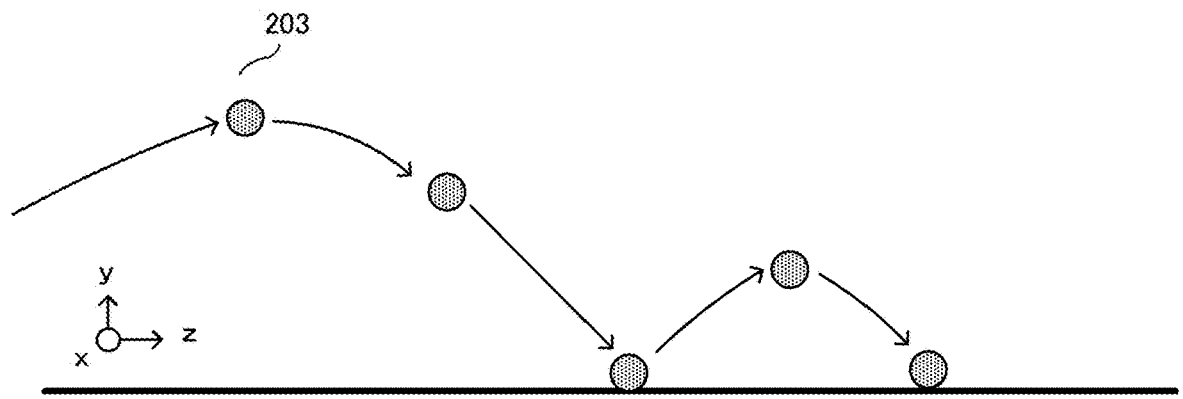
FIG. 9 shows a non-limiting example of a trajectory of a flat-shot ball 203.
Figure 10:
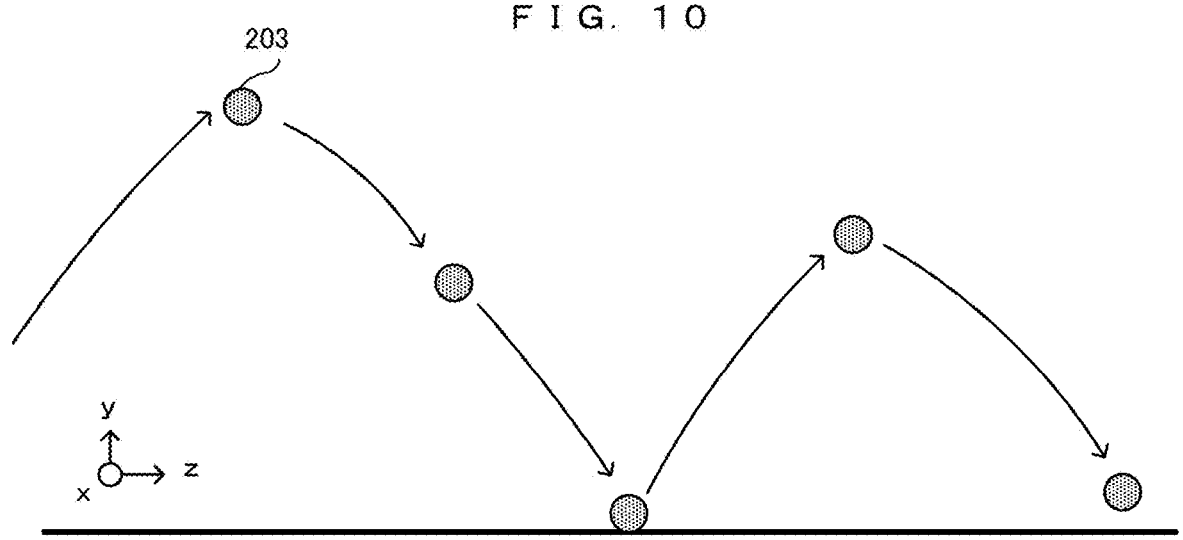
FIG. 10 shows a non-limiting example of a trajectory of a ball 203 with topspin.
Figure 11:
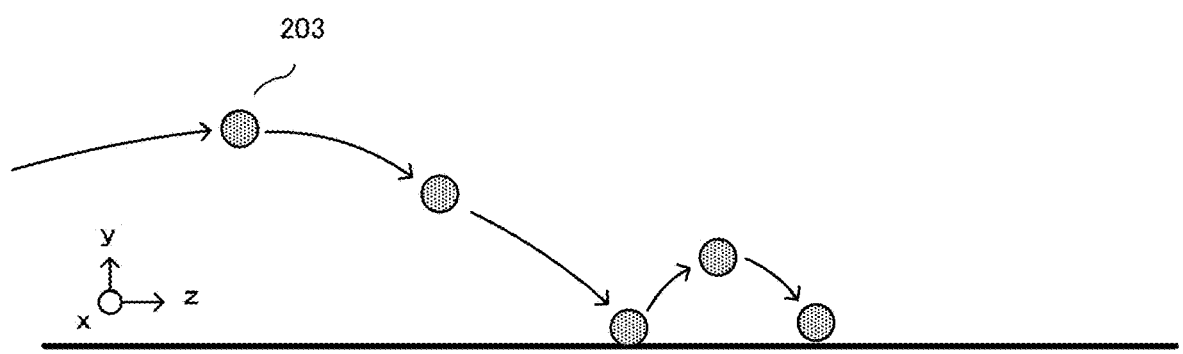
FIG. 11 shows a non-limiting example of a trajectory of a ball 203 with backspin.

FIG. 9 to FIG. 11 show examples of the trajectory (hereinafter, referred to as ball trajectory) of movement of the ball 203 under the above movement control. FIG. 9 shows an example of a ball trajectory when the ball 203 is not imparted with rotation, FIG. 10 shows an example of a ball trajectory when topspin is imparted, and FIG. 11 shows an example of a ball trajectory when backspin is imparted. FIG. 9 to FIG. 11 all show a case where the ball 203 is hit toward the z-axis positive direction. As shown in FIG. 10, the ball trajectory when topspin is imparted becomes such a ball trajectory that the ball 203 rises higher than in FIG. 9 and bounces farther toward the forward direction of the (z-axis) movement direction than in a case where the ball 203 is not imparted with rotation. On the other hand, in a case of backspin, as shown in FIG. 11, the ball trajectory becomes lower than in the case where the ball 203 is not imparted with rotation, and the height and the distance when the ball 203 bounces are smaller than in the case where the ball 203 is not imparted with rotation.

Figure 12:
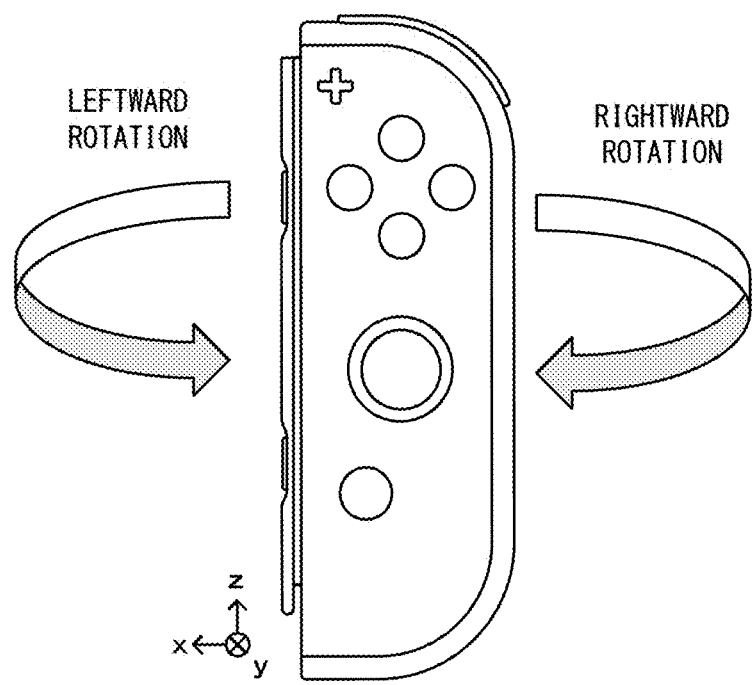
FIG. 12 illustrates a non-limiting example of how to swing the controller.
Figure 13:
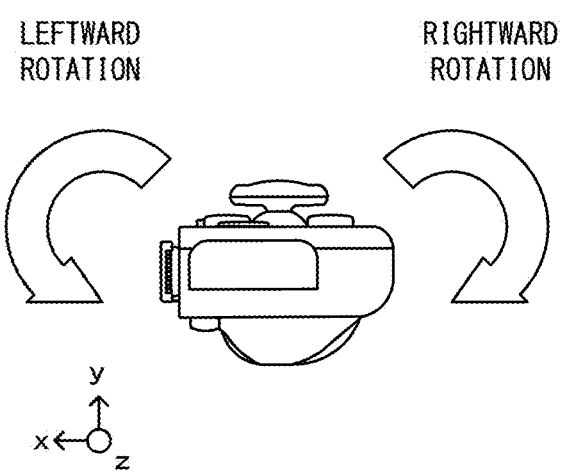
FIG. 13 illustrates a non-limiting example of how to swing the controller.

A determination method for the above ways of swing will be described more specifically. In the exemplary embodiment, twist of a wrist is determined on the basis of the degree of rotation (rotation amount) about the z axis of the right controller 4. FIG. 12 shows a plan view of the right controller 4 and FIG. 13 shows a back view thereof. As shown in FIG. 12, using an orientation in which the surface having the right stick 52 faces directly upward as a reference orientation, whether the rotation is rightward or leftward is determined. In general, in a case of imparting topspin, swing is performed in such a way as to impart rotation in the forward direction with respect to the direction in which the hit-back ball moves. In this case, about the z axis, an operation of swinging with the wrist twisted so as to rotate leftward is assumed (for a right-handed player). On the other hand, in a case of backspin, in contrast to the above, swing is performed in such a way as to impart rotation in the reverse direction with respect to the direction in which the hit-back ball moves. In this case, about the z axis, an operation of swinging with the wrist twisted so as to rotate rightward is assumed. Accordingly, in the exemplary embodiment, orientation change in the right controller 4 about the z axis during the swing operation is observed to determine whether the rotation is performed rightward or leftward, and the result is used for determination as to an operation of imparting topspin or backspin to the ball 203.

In addition, focusing on the actual way of swinging the racket when imparting topspin/backspin, in general, swing is performed in such a way as to swing up in the upward direction in the real space in a case of imparting topspin, and swing is performed in such a way as to swing down in the downward direction in the real space in a case of imparting backspin. Accordingly, in the exemplary embodiment, in addition to observation of rotation about the z axis described above, whether a swing action (swing direction) during the swing operation is a swing-up action (upward swing direction) or a swing-down action (downward swing direction) is also determined. Then, the result thereof is used for determination as to an operation for topspin/backspin. In the exemplary embodiment, the swing-up/swing-down determination is performed on the basis of the change amount of the orientation of the right controller 4 during the swing operation, and the details thereof will be described later.

Figure 14:
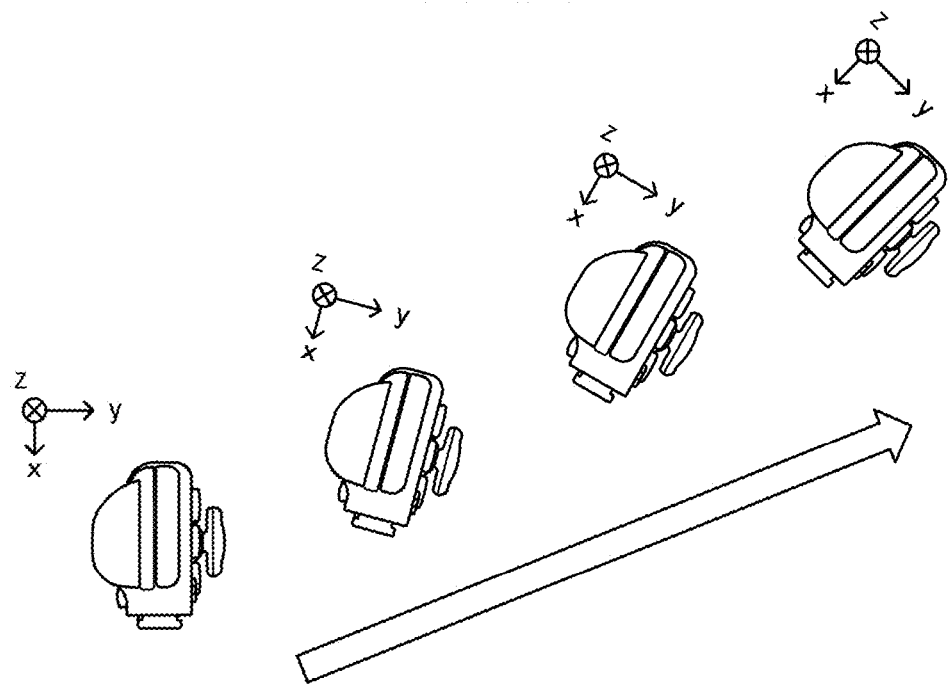
FIG. 14 illustrates a non-limiting example of how to swing the controller.
Figure 15:
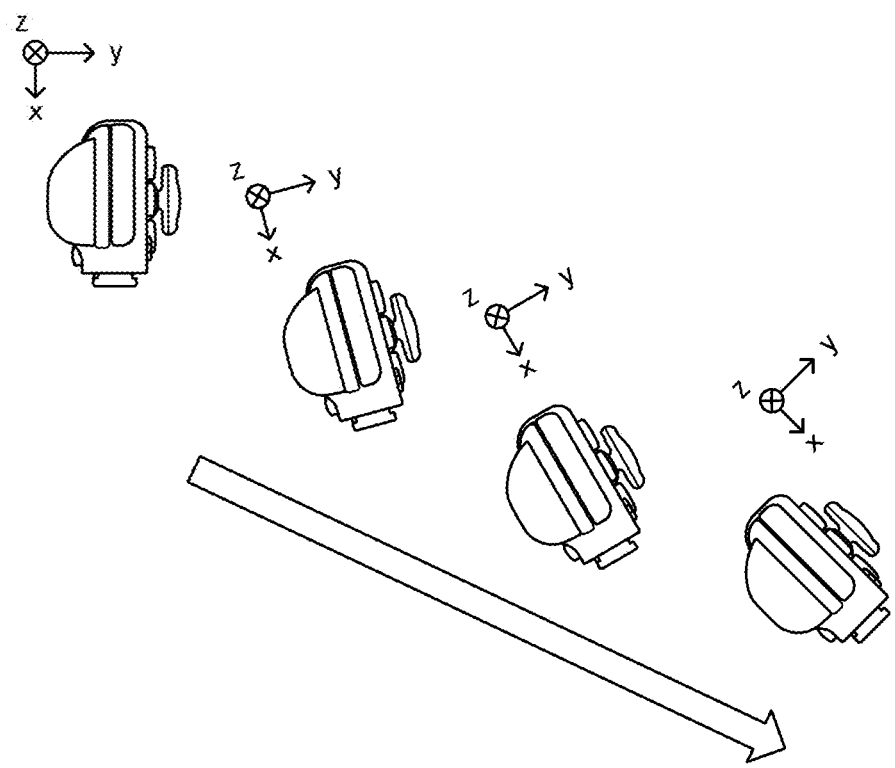
FIG. 15 illustrates a non-limiting example of how to swing the controller.

FIG. 14 shows an example of orientation change in the right controller 4 when topspin is imparted, and FIG. 15 shows an example of orientation change in the right controller 4 when backspin is imparted. FIG. 14 and FIG. 15 both show views of the right controller 4 as seen from the front side (side where the first R-button 60 and the ZR-button 61 can be seen). In a case of imparting topspin, a swing action of swinging up while rotating the controller leftward about the z axis is performed. In a case of imparting backspin, a swing action of swinging up while rotating the controller rightward about the z axis is performed.

In the exemplary embodiment, as described above, on the basis of parameters corresponding to two elements that are the degree of rotation (degree of twist of wrist) about the z axis and the up/down direction of the swing action (swing up/swing down), whether an operation of imparting topspin to the ball 203 (hereinafter, referred to as topspin operation) or an operation of imparting backspin to the ball 203 (hereinafter, referred to as backspin operation) has been performed is determined. In addition, in the exemplary embodiment, in a case where the parameters do not satisfy a predetermined condition, it is determined that an operation of hitting a ball by a so-called flat shot has been performed. In this case, movement control is performed so that the ball 203 moves with no rotation imparted. That is, the exemplary embodiment provides a player with such operability that allows three types of shots, i.e., a topspin shot, a backspin shot, and a flat shot, to be selectively used on the basis of the above parameters. In other words, processing for moving the ball 203 is performed such that the ball trajectory thereof, which would be a flat shot trajectory (see FIG. 9) if a shot is made in a normal way, is imparted with a first change (see FIG. 10) if a topspin operation is performed, or is imparted with a second change (see FIG. 11) if a backspin operation is performed.

Here, in the following description, the parameter indicating the degree of rotation about the z axis is referred to as "z-axis rotation value". In addition, the parameter indicating the up/down direction of the swing action is referred to as "up/down swing value". Further, a ball trajectory with topspin imparted is referred to as "topspin trajectory", a ball trajectory with backspin imparted is referred to as "backspin trajectory", and a ball trajectory with no rotation imparted is referred to as "flat-shot trajectory".

[Details of Tennis Game Processing in Exemplary Embodiment]

Next, with reference to FIG. 16 to FIG. 23, the tennis game processing in the exemplary embodiment will be described in more detail.

[Used Data]

First, various data used in this tennis game processing will be described. FIG. 16 is a memory map showing an example of various data stored in the DRAM 85 of the main body apparatus 2. The DRAM 85 of the main body apparatus 2 stores a game program 301, character object data 302, character action control data 303, ball movement control data 304, swing determination data 305, a swing state flag 306, a spin determination parameter 307, operation data 308, and the like.

The game program 301 is a program for executing the tennis game processing in the exemplary embodiment.

The character object data 302 is data regarding the outer appearances of the player character 201 and the opponent character 202. The character object data 302 includes modeling data for a three-dimensional model of each character object, texture data thereof, and the like.

The character action control data 303 is data for controlling an action of each character. The character action control data 303 includes various data for controlling character actions, such as present position information of each character object, a movement target position in automatic movement control, motion data for reproducing various motions such as the aforementioned racket swing motion, and data indicating the present state of each character, e.g., whether or not each character is in a state of reproducing a motion.

The ball movement control data 304 is data for performing movement control of the ball 203. The ball movement control data 304 includes data indicating the trajectory of a ball, the movement speed thereof, and the like.

The swing determination data 305 is data for determining whether or not a swing operation has been performed, and is data indicating a content relevant to the swing operation. Specifically, the swing determination data 305 is a buffer capable of storing acceleration data and/or angular velocity data obtained from the aforementioned inertial sensors over a predetermined period (e.g., several tens of frames). In the exemplary embodiment, using the swing determination data 305, occurrence and finish of a swing operation as described above are detected and with what motion the swing operation has been performed is determined.

The swing state flag 306 is a flag indicating whether or not the right controller 4 is being swung at the present (swing state). When the flag is ON, the flag indicates that the right controller 4 is in a swing state at the present. The swing state flag 306 is initially set at OFF.

Figure 17:
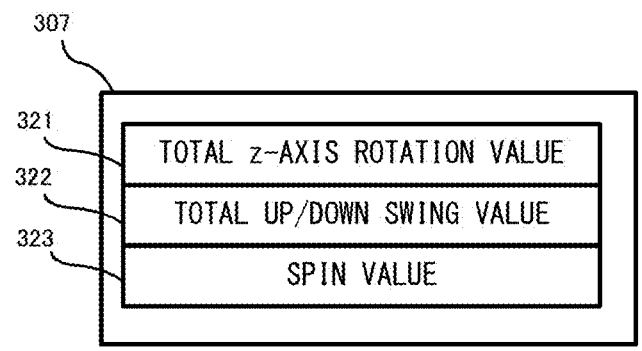
FIG. 17 shows a non-limiting example of spin determination parameter 307.

The spin determination parameter 307 is data used for determination as to whether or not an operation of imparting spin as described above has been performed. FIG. 17 shows an example of parameters included in the spin determination parameter 307. The spin determination parameter 307 includes a total z-axis rotation value 321 and a total up/down swing value 322. The total z-axis rotation value 321 is the sum (cumulative sum) of z-axis rotation values calculated every frame during the swing state. Similarly, the total up/down swing value 322 is the sum of up/down swing values calculated every frame during the swing state. In the exemplary embodiment, the z-axis rotation value is calculated as a value in a range of −256 to +256, as an example. Then, 0 indicates a state at the reference orientation, a positive value indicates leftward rotation, and a negative value indicates rightward rotation (namely, the magnitudes of rightward rotation and leftward rotation are each represented at 256 levels). The up/down swing value is also calculated as a value in a range of −256 to +256, as an example. Then, 0 indicates a state at the reference orientation, a positive value indicates a swing-up state and the magnitude of the motion thereof, and a negative value indicates a swing-down state and the magnitude of the motion thereof (namely, the magnitudes of the swing-up motion and the swing-down motion are each represented at 256 levels). Further, the spin determination parameter 307 includes a spin value 323. The spin value 323 is a parameter calculated on the basis of the total z-axis rotation value 321 and the total up/down swing value 322, and indicating the amount of rotation (magnitude of rotation) imparted to the ball 203. The spin value 323 is calculated as a value in a range of −256 to +256, as an example. Then, a negative value indicates the amount of backspin rotation, a positive value indicates the amount of topspin rotation, and 0 indicates that there is no rotation (i.e., flat shot).

In this example, the z-axis rotation value and the up/down swing value are treated using a positive value and a negative value in combination with respect to 0 at the center. In another exemplary embodiment, the z-axis rotation values for indicating rightward rotation and leftward rotation may be each calculated as a positive value individually, and also the up/down swing values for indicating swing up and swing down may be each calculated as a positive value individually.

Figure 18:
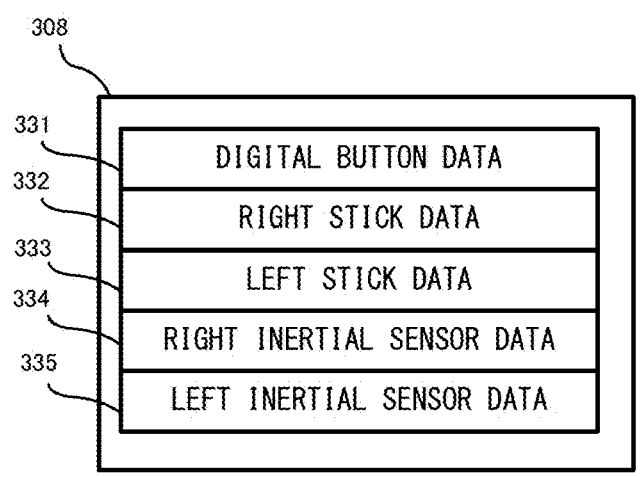
FIG. 18 shows a non-limiting example of operation data 308.

The operation data 308 is data obtained from the left controller 3 and the right controller 4, and is data indicating the operation content of the user. FIG. 18 shows an example of the data structure of the operation data 308. The operation data 308 includes at least digital button data 331, right stick data 332, left stick data 333, right inertial sensor data 334, and left inertial sensor data 335. The digital button data 331 is data indicating press states of various buttons provided to the controller. The right stick data 332 is data indicating the content of operation to the right stick 52. Specifically, the right stick data 332 includes two-dimensional data of x and y. The left stick data 333 is data indicating the content of operation to the left stick 32. The right inertial sensor data 334 is data indicating detection results of inertial sensors such as the acceleration sensor 114 and the angular velocity sensor 115 of the right controller 4. Specifically, the right inertial sensor data 334 includes acceleration data for three axes and angular velocity data for three axes. The left inertial sensor data 335 is data indicating detection results of inertial sensors such as the acceleration sensor 104 and the angular velocity sensor 105 of the left controller 3.

Besides, various data necessary for the game processing are also generated as appropriate and stored in the DRAM 85.

[Details of Processing Executed by Processor 81]

Next, the details of the tennis game processing in the exemplary embodiment will be described. Here, operations for imparting topspin/backspin as described above and processing relevant thereto will be mainly described, while description of the details of other tennis game processes is omitted. Flowcharts shown below are merely examples of the processing procedure. Therefore, as long as the same result is obtained, the order of the processing steps may be changed. In addition, the values of variables and thresholds used in determination steps are also merely examples, and other values may be used as necessary.

Figure 19:
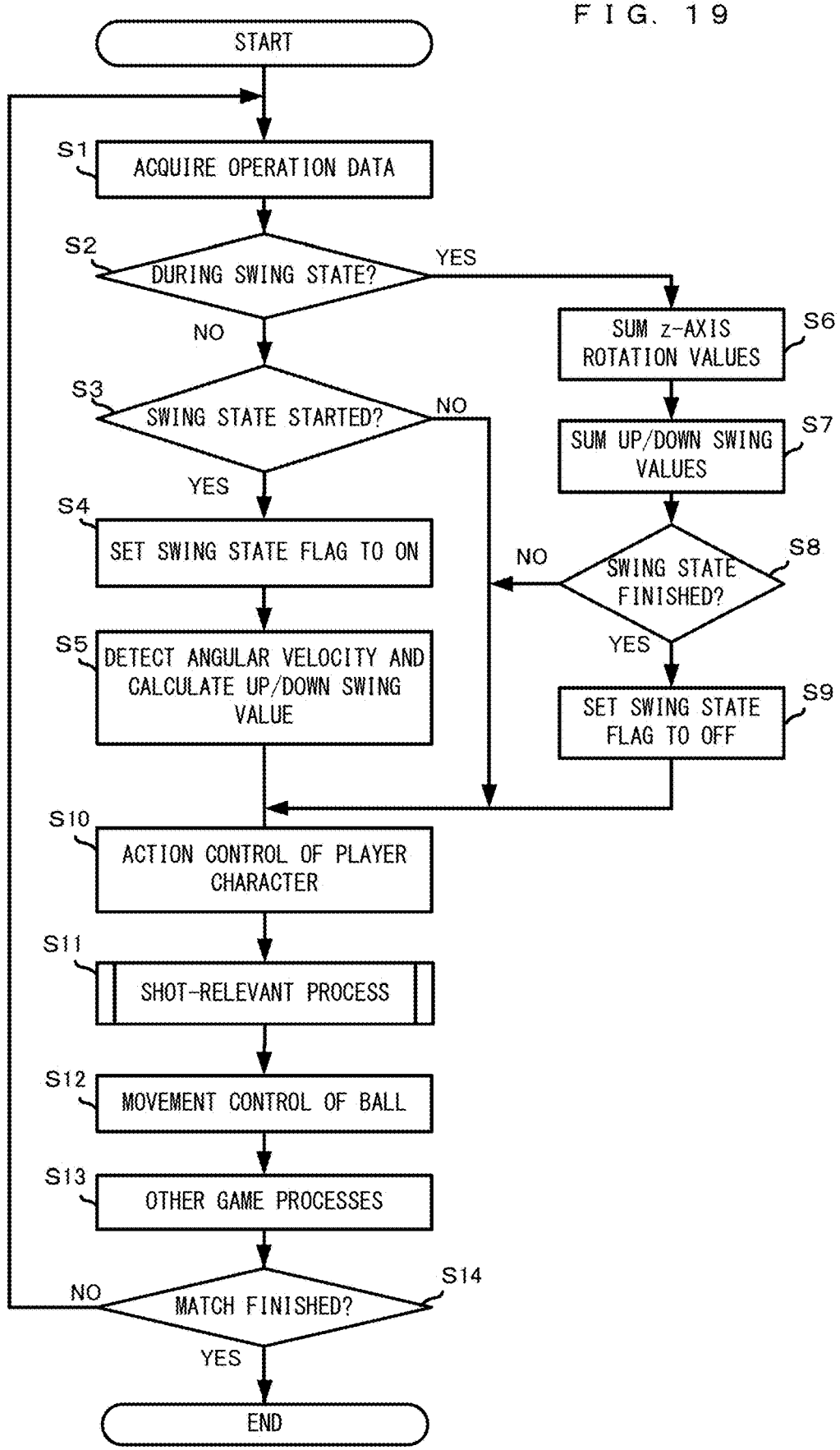
FIG. 19 is a non-limiting example of a flowchart showing the details of tennis game processing according to the exemplary embodiment.

FIG. 19 is a flowchart showing the details of the tennis game processing (for one match) according to the exemplary embodiment. The processing loop from step S1 to step S14 in FIG. 19 is repeatedly executed every frame.

When the tennis game processing (match) is started, first, in step S1, the processor 81 acquires the operation data 308.

Next, in step S2, the processor 81 determines whether or not the swing state flag 306 is ON, to determine whether the present state is a swing state. As a result of the determination, if the present state is not a swing state (NO in step S2), in step S3, the processor 81 determines whether or not a swing state is started on the basis of the swing determination data 305. A detection method for a swing state may be any method. In the exemplary embodiment, a swing state is determined on the basis of the acceleration in the z-axis direction. That is, the processor 81 determines whether or not the acceleration in the z-axis direction of the right controller 4 exceeds a predetermined threshold, on the basis of the swing determination data 305. As a result, if the acceleration exceeds the predetermined threshold, the processor 81 determines that a swing state is started.

As a result of the determination, if a swing state is not started (NO in step S3), the process proceeds to step S10 described later. On the other hand, if a swing state is started (YES in step S3), in step S4, the processor 81 sets the swing state flag 306 to ON. In addition, at this time, the processor 81 initializes the content of the spin determination parameter 307.

Next, in step S5, the processor 81 acquires a detected value of the angular velocity about the z axis on the basis of the right inertial sensor data 334, converts the acquired value to a value in a range of −256 to +256 as described above, and stores the converted value as the total z-axis rotation value 321. Further, the processor 81 calculates the up/down swing value at this time, converts this value to a value in a range of −256 to +256 as described above, and stores the converted value as the total up/down swing value 322. Then, the processor 81 proceeds to step S10 described later.

Here, an example of a calculation method for the up/down swing value will be described. As the calculation method, any method may be used as long as the magnitude of swing in the up/down direction can be calculated. In the exemplary embodiment, the up/down swing value is calculated on the basis of the swing determination data 305, by the following method.

(1) First, a cross product of a present vector indicating in which direction the z-axis direction of the right controller 4 is directed at the present, which is calculated from the present orientation of the controller, and a last orientation vector indicating in which direction the z-axis direction of the right controller 4 is directed 1 frame ago, which is calculated from the orientation of the controller 1 frame ago, is calculated, and a first normal vector is calculated on the basis of the cross product.

(2) Next, a two-dimensional vector is calculated by extracting only x-axis and y-axis components of the first normal vector.

(3) Next, a cross product of the present vector and the two-dimensional vector is calculated, and a second normal vector is calculated on the basis of the cross product.

(4) Whether the swing motion is a swing-up motion or a swing-down motion can be determined on the basis of whether the direction of the second normal vector is upward or downward. Therefore, on the basis of the second normal vector, a value indicating the magnitude of a swing-up/swing-down motion (change amount of orientation) is calculated as the up/down swing value. Here, the up/down swing value is calculated to be a value in a range of −256 to +256 as described above.

Regarding calculation of the first normal vector in the above calculation method, in the exemplary embodiment, the orientation of the controller 1 frame ago is used as the last orientation vector. In another exemplary embodiment, the orientation of the controller calculated from the right inertial sensor data 334 acquired at the last time instead of 1 frame ago may be used. For example, in a case where the interval at which the operation data 308 is transmitted from the controller to the main body apparatus 2 is smaller than the frame rate interval, a plurality of inertial sensor data can be acquired within 1 frame. Then, the orientation of the controller (last orientation vector) may be calculated on the basis of the last acquired data among the plurality of inertial sensor data.

Next, processing in a case where it is determined that the present state is a swing state (YES in step S2) as a result of the determination in step S2 will be described. In this case, first, in step S6, the processor 81 calculates the z-axis rotation value on the basis of the right inertial sensor data 334, and adds the z-axis rotation value to the total z-axis rotation value 321. That is, processing of sequentially summing the z-axis rotation values detected every frame during the swing state is performed.

Next, in step S7, the processor 81 calculates the up/down swing value as described above on the basis of the swing determination data 305, and adds the up/down swing value to the total up/down swing value 322. That is, processing of sequentially summing the up/down swing values detected every frame during the swing state is performed.

Next, in step S8, the processor 81 determines whether or not the swing state is finished on the basis of the swing determination data 305. As a result of the determination, if the swing state has finished (YES in step S8), in step S9, the processor 81 sets the swing state flag 306 to OFF. Then, the process proceeds to step S10 described later. On the other hand, if the swing state has not finished yet (NO in step S8), the processing in step S9 is skipped.

In another exemplary embodiment, the determination in step S8 may be performed before step S6, or may be performed at another timing.

Next, in step S10, the processor 81 performs action control of the player character 201 on the basis of the character action control data 303 and the like. Specifically, the following control is performed. First, control for automatic movement as described above is performed. Further, if it is determined that a swing state is started in step S3, control for causing the player character 201 to start a racket swing motion is also performed. At this time, at what coordinates in the virtual space the racket and the ball 203 should collide with each other is calculated, and a racket swing motion is started in accordance with such a height that the racket swing motion passes the collision coordinates. In addition, if it is determined that the present state is a swing state in step S2, control for continuing reproduction of the racket swing motion that has been already started until the motion finishes, is also performed. Along with the racket swing motion, the racket also moves to come into a state in which the ball 203 and the racket can collide with each other. Besides, various processes for controlling the action of the player character 201, such as update of data indicating the present position and the present state of the player character 201, are also executed.

Figure 20:
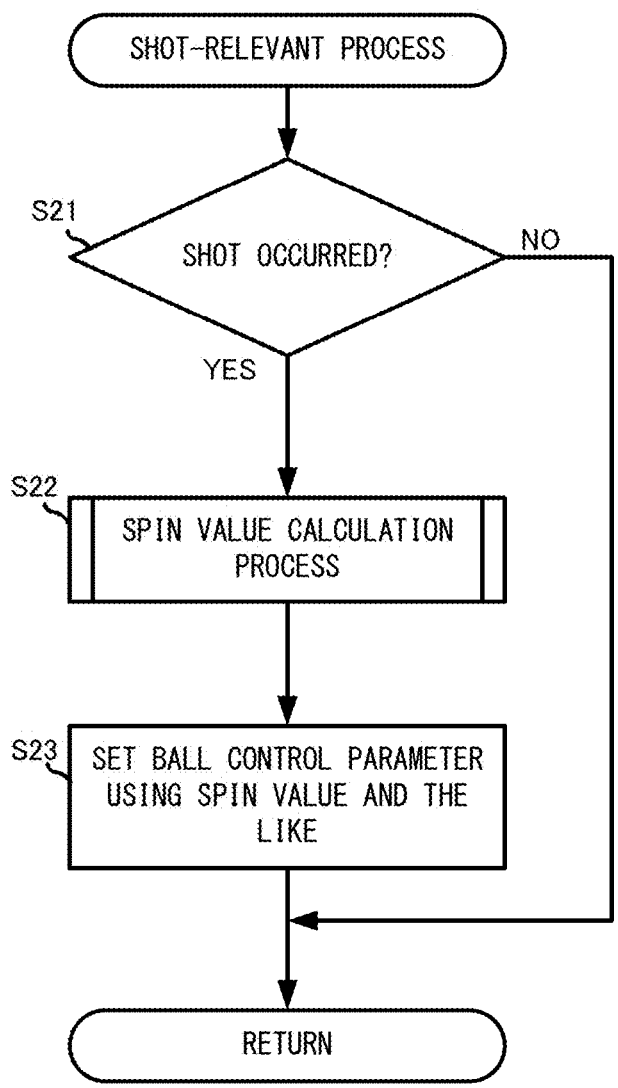
FIG. 20 is a non-limiting example of a flowchart showing the details of a shot-relevant process.

Next, in step S11, the processor 81 executes a shot-relevant process. FIG. 20 is a flowchart showing the details of the shot-relevant process. In FIG. 20, first, in step S21, the processor 81 determines whether or not the ball 203 and the racket have collided with each other, i.e., whether or not a shot has occurred. Here, a timing when the shot occurs is when the racket swing motion of the player character 201 is being reproduced. As a result of the determination, if no shot has occurred (NO in step S21), the processor 81 ends the shot-relevant process.

On the other hand, as a result of the determination in step S21, if a shot has occurred (YES in step S21), in step S22, the processor 81 executes a spin value calculation process. This process is a process for calculating the spin value to be applied to the ball trajectory of the ball 203 to be hit back.

Figure 21:
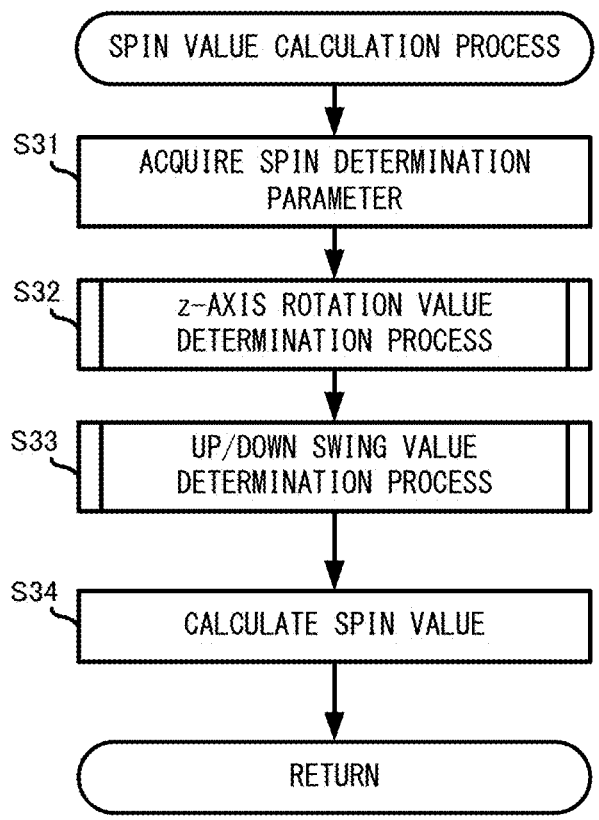
FIG. 21 is a non-limiting example of a flowchart showing the details of a spin value calculation process.

FIG. 21 is a flowchart showing the details of the spin value calculation process. In FIG. 21, first, in step S31, the processor 81 acquires the spin determination parameter 307. Next, in step S32, the processor 81 executes a z-axis rotation value determination process. This process is a process for determining whether or not an operation for imparting topspin or backspin has been performed on the basis of the total z-axis rotation value 321 over a period from the start of the swing state to the time when the shot occurs.

Figure 22:
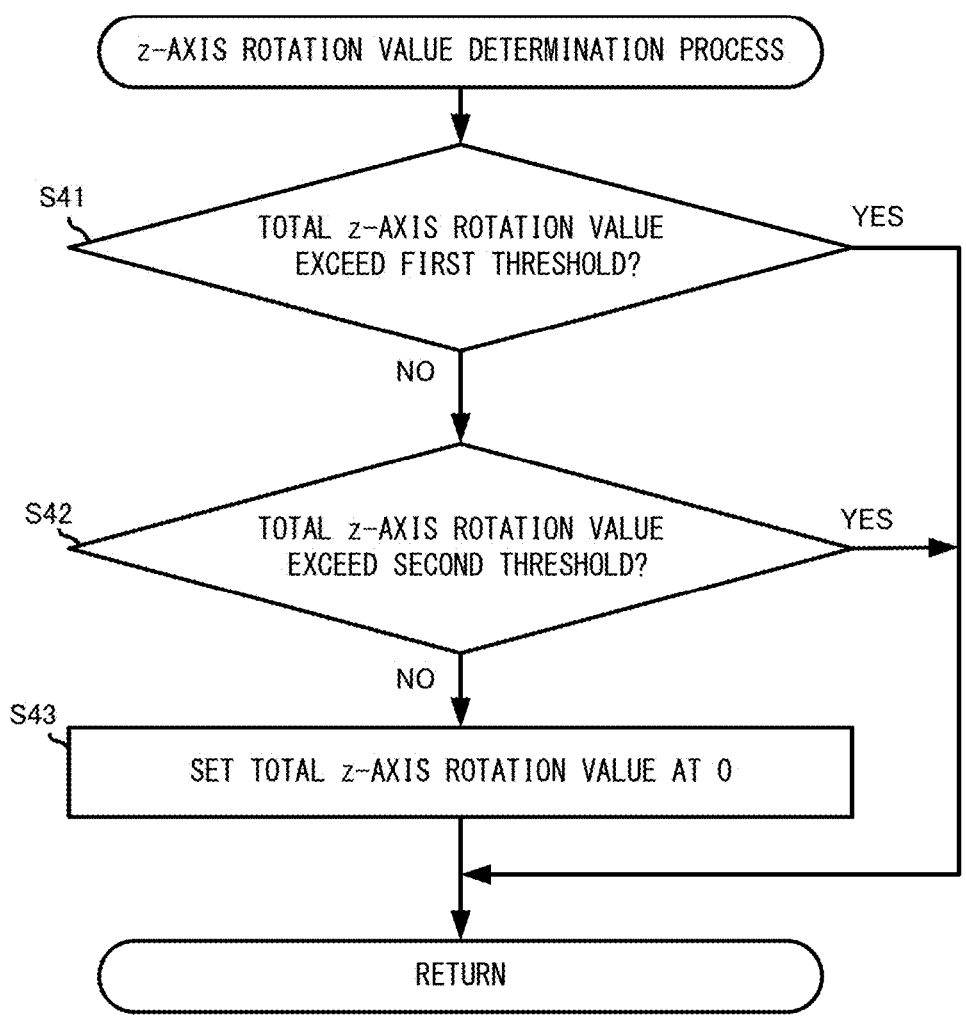
FIG. 22 is a non-limiting example of a flowchart showing the details of a z-axis rotation value determination process.

FIG. 22 is a flowchart showing the details of the z-axis rotation value determination process. In FIG. 22, first, in step S41, the processor 81 determines whether or not the total z-axis rotation value 321 exceeds a first threshold. The first threshold is a condition for determining that an operation of imparting topspin has been performed. Therefore, in this determination, whether the amount of leftward rotation about the z axis exceeds the first threshold is determined. In the exemplary embodiment, the z-axis rotation value for leftward rotation is represented by a positive value, as an example. Therefore, in the positive direction, whether or not the first threshold is exceeded is determined. As a result of the determination, if the first threshold is exceeded (YES in step S41), the processor 81 ends the z-axis rotation value determination process.

On the other hand, if the first threshold is not exceeded (NO in step S41), next, in step S42, the processor 81 determines whether or not the total z-axis rotation value 321 exceeds a second threshold. The second threshold is a condition for determining that an operation of imparting backspin has been performed. Therefore, in this determination, whether the amount of rightward rotation about the z axis exceeds the second threshold is determined. In the exemplary embodiment, the z-axis rotation value for rightward rotation is represented by a negative value, as an example. Therefore, in the negative direction, whether or not the second threshold is exceeded is determined. As a result of the determination, if the second threshold is exceeded (YES in step S42), the processor 81 ends the z-axis rotation value determination process.

On the other hand, if the second threshold is not exceeded (NO in step S42), next, in step S43, the processor 81 sets the total z-axis rotation value 321 at 0. This is setting for realizing the aforementioned flat shot. That is, in the exemplary embodiment, if the twist amount of the wrist during the swing state is so small as not to exceed each of the above thresholds, the total z-axis rotation value 321 is set at 0, whereby the shot is regarded as a flat shot in which the ball 203 is not imparted with rotation. In other words, a case where the total z-axis rotation value 321 is not 0 can be said as a state in which a condition for imparting the ball 203 with an effect of topspin or backspin is satisfied. As described later, in order that the shot is finally determined to be a flat shot, it is required that both of the total z-axis rotation value 321 and the total up/down swing value 322 are 0. Thus, the z-axis rotation value determination process is ended.

Returning to FIG. 21, next, in step S33, the processor 81 executes an up/down swing value determination process. This process is a process for determining whether or not an operation for imparting topspin or backspin has been performed on the basis of the total up/down swing value 322 over the period from the start of the swing state to the time when the shot occurs.

Figure 23:
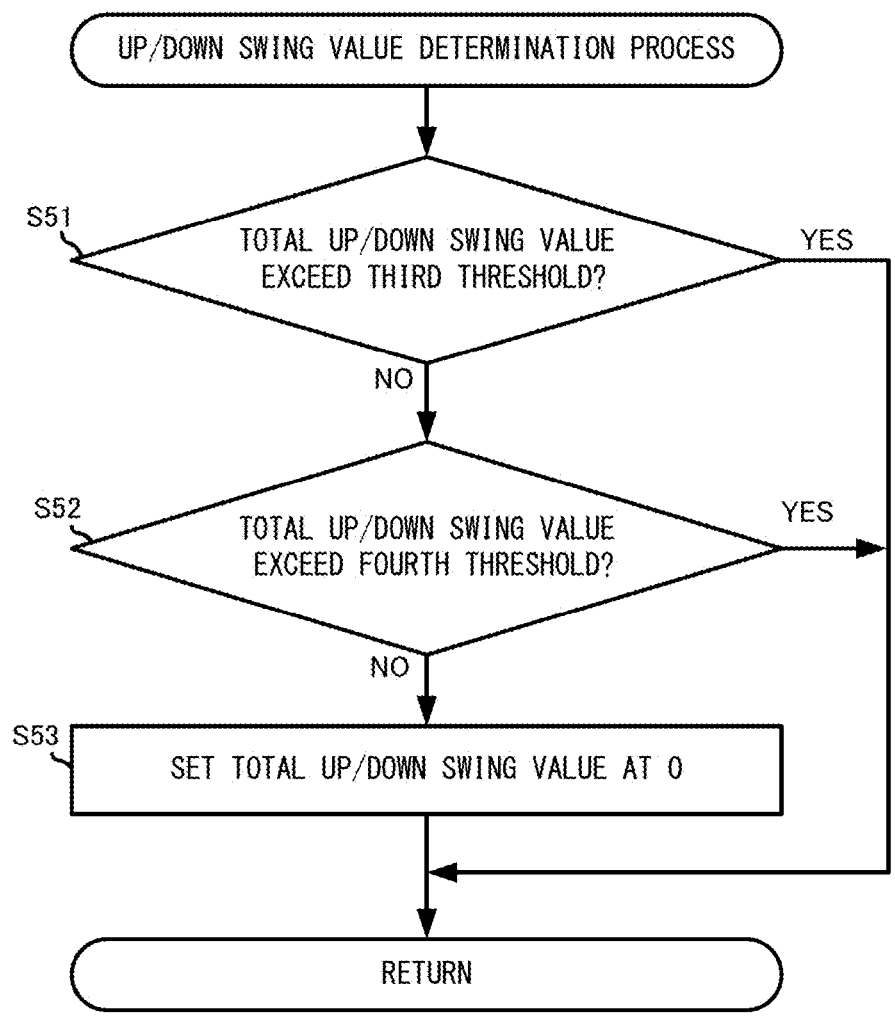
FIG. 23 is a non-limiting example of a flowchart showing the details of an up/down swing value determination process.

FIG. 23 is a flowchart showing the details of the up/down swing value determination process. In FIG. 23, first, in step S51, the processor 81 determines whether or not the total up/down swing value 322 exceeds a third threshold. The third threshold is a condition for determining that an operation of imparting topspin has been performed. Therefore, in this determination, whether the swing direction of the right controller 4 is an upward direction (up swing) and the magnitude of the swing exceeds the third threshold, is determined. As a result of the determination, if the third threshold is exceeded (YES in step S51), the processor 81 ends the up/down swing value determination process.

On the other hand, if the third threshold is not exceeded (NO in step S51), next, in step S52, the processor 81 determines whether or not the total up/down swing value 322 exceeds a fourth threshold. The fourth threshold is a condition for determining that an operation of imparting backspin has been performed. Therefore, in this determination, whether the swing direction of the right controller 4 is a downward direction (down swing) and the magnitude of the swing exceeds the fourth threshold, is determined. As a result of the determination, if the fourth threshold is exceeded (YES in step S52), the processor 81 ends the up/down swing value determination process.

On the other hand, if the fourth threshold is not exceeded (NO in step S52), next, in step S53, the processor 81 sets the total up/down swing value 322 at 0. This is also setting for realizing the aforementioned flat shot, as in the case of the z-axis rotation value. That is, in the exemplary embodiment, if a motion of swinging up/swinging down during the swing state is so small as not to exceed each of the above thresholds, the total up/down swing value 322 is set at 0, whereby the shot is regarded as a flat shot in which the ball 203 is not imparted with rotation. Thus, the up/down swing value determination process is ended.

Returning to FIG. 21, next, in step S34, the processor 81 calculates the spin value 323 on the basis of the total z-axis rotation value 321 and the total up/down swing value 322. Specifically, the spin value 323 is calculated by the following expression.

Spin value=total z-axis rotation value 321+(total up/down swing value 322×weight)   Expression 1

By the above expression, any of the spin value 323 for indicating topspin, the spin value 323 for indicating backspin, or the spin value 323 indicating that no rotation is imparted, is calculated. In the above expression, the weight is used in view of game balance adjustment and the like. For example, if the total up/down swing value 322 is directly used without applying the weight, there is a possibility that the player feels that rotation imparted to the ball 203 is too strong or too weak in the player's game experience. There is also a possibility that the player feels that topspin/backspin is readily/hardly imparted when the player actually makes a motion of swinging up/swinging down. Accordingly, in the exemplary embodiment, the total up/down swing value 322 is adjusted using the above weight, thereby calculating the spin value 323 so as to provide a more appropriate experience to the player. In the exemplary embodiment, the weight is set at 0.8, as an example. That is, adjustment is performed so that the orientation change amount of the right controller 4 due to swinging up/swinging down decreases.

Thus, the spin value calculation process is ended.

Returning to FIG. 20, next, in step S23, the processor 81 sets the ball movement control data 304 so that the spin value 323 calculated as described above is reflected in the trajectory of the ball 203. Specifically, the processor 81 calculates the ball trajectory and the movement speed of the ball 203 hit back by the shot, on the basis of the content of the spin value 323, the swing direction and the swing speed calculated from the swing determination data 305, and the like. At this time, the ball trajectory of the hit-back ball 203 is calculated so as to be any of a topspin trajectory (when the spin value 323 is positive), a backspin trajectory (when the spin value 323 is negative), or a flat-shot trajectory (when the spin value 323 is 0), on the basis of the spin value 323. For example, the way of the ball 203 bouncing and the like are set on the basis of the spin value 323. Then, the processor 81 sets information indicating the calculated ball trajectory and movement speed, as the ball movement control data 304. Thus, the shot-relevant process is ended.

Returning to FIG. 19, next, in step S12, the processor 81 performs movement control of the ball 203 on the basis of the ball movement control data 304. That is, the processor 81 moves the ball 203 along the ball trajectory indicated by the ball movement control data 304. In the exemplary embodiment, the ball trajectory is any of the topspin trajectory, the backspin trajectory, or the flat-shot trajectory.

Next, in step S13, the processor 81 executes other game processes relevant to this tennis game. Specifically, the processor 81 performs action control of the opponent character 202. At this time, also the ball 203 shot by the opponent character 202 may be set as appropriate so as to be any of a topspin trajectory, a backspin trajectory, or a flat-shot trajectory. In addition, the processor 81 executes various other game processes relevant to advancement of the tennis game, such as determination for whether or not to give a point, update of the score status, and management of advancement of the match. Further, the processor 81 takes an image of a virtual game space with the above game process reflected therein, by the virtual camera, to generate a game image. Then, the processor 81 outputs the game image to the stationary monitor or the like.

Next, in step S14, the processor 81 determines whether or not a condition for finishing the match is satisfied. If the condition for finishing the match is not satisfied (NO in step S14), the process returns to step S1, so that the process is repeated. If the condition for finishing the match is satisfied (YES in step S14), the processor 81 ends the tennis game processing.

Thus, the detailed description of the tennis game processing according to the exemplary embodiment is finished.

As described above, in the exemplary embodiment, in such a tennis game, two elements that are the magnitude of twist of a wrist in a swing operation of the right controller 4 (z-axis rotation value) and execution of a swing-up/swing-down action (up/down swing value), are used to determine whether or not an operation for imparting topspin or backspin to the ball 203 has been performed. In addition, in the exemplary embodiment, if either the magnitude of twist of a wrist or the magnitude of a swing-up/swing-down action exceeds a predetermined threshold, in accordance with the content thereof, an effect of topspin or backspin is imparted to the ball 203. Thus, accuracy of determination for a swing operation corresponding to topspin or backspin can be improved.

In the exemplary embodiment, even when one of the total z-axis rotation value 321 and the total up/down swing value 322 is 0, if the other is not 0, the trajectory of the ball 203 can be set to be a topspin trajectory or a backspin trajectory. That is, if at least one of the total z-axis rotation value 321 and the total up/down swing value 322 satisfies a condition for imparting either of the above spin effects, an effect of topspin or backspin is imparted to the ball 203 on the basis of the spin value 323. Thus, for example, it becomes possible to adapt to such a swing way (operation) as to impart spin without twisting a wrist. For example, in actual tennis, topspin rotation can be imparted also by directly swinging up the arm from the lower side to the upper side while the racket face in a vertical state is impacting on the ball. Also in a case of performing an operation without twist of a wrist as described above, in the exemplary embodiment, it is possible to impart an effect of topspin to the ball 203.

Modifications

In the above exemplary embodiment, at a timing when a swing operation is finished, the content of the performed swing operation (swing direction, swing speed, presence/absence of operation for imparting spin) is determined, and a racket swing motion corresponding to the determined content is started. In another exemplary embodiment, control may be performed such that, as the swing state is started, a racket swing motion corresponding to a swing direction detected at this time is started. In this case, whether or not a shot has occurred may be determined during the racket swing motion. Then, if a shot has occurred, the content (spin value 323, etc.) of a swing operation in a period from the start of the swing state to the time when the shot occurs may be calculated and the ball movement control data 304 may be set in accordance with the content.

Regarding calculation of the spin value 323, in the exemplary embodiment, even when one of the total z-axis rotation value 321 and the total up/down swing value 322 is 0, if the other is not 0, the trajectory of the ball 203 can be set to be a topspin trajectory or a backspin trajectory. In this regard, in another exemplary embodiment, a state in which both of the total z-axis rotation value 321 and the total up/down swing value 322 exceed predetermined thresholds as described above may be a condition for imparting an effect of topspin or backspin to the ball 203. In this case, if one of the total z-axis rotation value 321 and the total up/down swing value 322 does not satisfy the condition for imparting each spin effect, the shot may be regarded as a flat shot.

In the above exemplary embodiment, regarding a racket swing motion, the player character 201 is caused to make three types of motions, i.e., a motion for topspin, a motion for backspin, and a motion for flat shot. In another exemplary embodiment, one type of racket swing motion may be used (for example, only motion for flat shot). Even in this case, a topspin operation or a backspin operation during a swing operation may be reflected in the trajectory of the shot ball 203.

In the above exemplary embodiment, control is performed such that, at the time when a shot occurs, the trajectory of the hit-back ball 203 is calculated and then the ball 203 is moved along the calculated trajectory. That is, on the basis of the spin value 323, a trajectory that will be made when topspin or backspin is imparted is calculated at the time when a shot has occurred. In this regard, in another exemplary embodiment, control may be performed such that a motion of the ball 203 is simulated in real time without calculating such a trajectory (in advance). For example, control may be performed such that, on the basis of the movement speed of the ball, the movement direction thereof, and a parameter indicating rotation based on the spin value 323, a motion of the ball 203 is simulated in the virtual space every frame.

In the above exemplary embodiment, when a swing operation has occurred, a racket swing motion is started, and when a shot has occurred, a ball trajectory with the spin value 323 reflected therein is determined. In other words, the spin value 323 is not reflected in the racket swing motion. In another exemplary embodiment, the player character may be caused to make a racket swing motion in accordance with the spin value 323 (i.e., the degree of twist of a wrist and the up/down swing direction). For example, at the timing when the shot has occurred, a motion to be made by the player character subsequently may be set in accordance with the spin value 323. For example, in a case where the ball trajectory is set to be a topspin trajectory, the player character may be caused to make a motion of swinging up the racket subsequently to occurrence of the shot, and in a case where the ball trajectory is set to be a backspin trajectory, the player character may be caused to make a motion of swinging down the racket. In still another exemplary embodiment, at the time when it is determined that a swing operation has finished, the degree of twist of a wrist and the up/down swing direction in the performed swing operation may be calculated. Then, in accordance with the result, the player character 201 may be controlled to start a motion for topspin or a motion for backspin, for example.

In the above exemplary embodiment, the tennis game is shown as an example. Besides, also for various ball sport games in which a ball can be imparted with rotation, the above processing is applicable. For example, sport games such as table tennis and baseball may be employed.

Further, also for a game in which a predetermined object other than a ball can be imparted with rotation and a game that includes elements using twist of a wrist and selective swing in an up/down direction, the above processing is applicable. That is, in the above exemplary embodiment, processing of imparting an effect of topspin/backspin to the ball 203 is shown as an example of processing based on the total z-axis rotation value 321 and the total up/down swing value 322. In this regard, in another exemplary embodiment, another predetermined processing may be executed instead of such processing of imparting a spin effect to the ball. For example, in a fighting game that can be played while a controller is swung, an operation like uppercut with a wrist twisted may be determined, to perform predetermined processing. Alternatively, a game in which a player character can be caused to make a motion of swinging a sword by swinging the controller resembling a sword, is also applicable. For example, in a game in which such an attack as to shoot a shock wave by swinging a sword can be performed, processing for determining whether or not such an attack can be executed (whether or not to shoot a shock wave) and setting the direction and the trajectory for the shock wave to be shot may be performed as processing based on the total z-axis rotation value 321 and the total up/down swing value 322 as described above.

In the above exemplary embodiment, the case where a series of processes for the tennis game processing is executed by a single main body apparatus 2 has been described. In another exemplary embodiment, the series of processes may be executed by an information processing system including a plurality of information processing apparatuses. For example, in an information processing system including a terminal-side apparatus and a server-side apparatus capable of communicating with the terminal-side apparatus via a network, a part of the series of processes may be executed by the server-side apparatus. Further, in such an information processing system including a terminal-side apparatus and a server-side apparatus capable of communicating with the terminal-side apparatus via a network, a major process of the series of processes may be executed by the server-side apparatus, and a part of the series of processes may be executed by the terminal-side apparatus. In such an information processing system, a server-side system may be composed of a plurality of information processing apparatuses, and processing to be executed on the server side may be executed by the plurality of information processing apparatuses in a shared manner. A so-called cloud gaming configuration may be adopted. For example, the main body apparatus 2 may send operation data indicating an operation from a user to a predetermined server, various game processes may be executed in the server, and the execution result may be distributed as a video and/or sound to the main body apparatus 2 by streaming.

While the exemplary embodiments have been described herein, it is to be understood that the above description is, in all aspects, merely an illustrative example, and is not intended to limit the scope thereof. It is to be understood that various modifications and variations can be made without deviating from the scope of the exemplary embodiments.

What is claimed is:

1. A computer-readable non-transitory storage medium having stored therein an information processing program to be executed by a computer of an information processing apparatus, the program causing the computer to:
   acquire, from an operation device having an inertial sensor, operation data including at least data based on an output of the inertial sensor;
   determine whether or not the operation device is in a swing state in which the operation device is being swung, on the basis of the operation data;
   determine whether the operation device is rotated in a first direction about a predetermined axis of the inertial sensor or a second direction opposite to the first direction, on the basis of the operation data;
   determine whether the operation device is swung in an upward direction or a downward direction, on the basis of the operation data;
   execute first processing in at least a case where it is determined that the operation device is rotated in the first direction about the predetermined axis and a case where it is determined that the operation device is swung in the upward direction, during a period in which the operation device is in the swing state, on the basis of the operation data; and
   execute second processing in at least a case where it is determined that the operation device is rotated in the second direction about the predetermined axis and a case where it is determined that the operation device is swung in the downward direction, during a period in which the operation device is in the swing state, on the basis of the operation data.

2. The computer-readable non-transitory storage medium according to claim 1, the program further causing the computer to:
   move a moving object in a virtual space on the basis of the first processing or the second processing; and
   execute game processing using the moving object.

3. The computer-readable non-transitory storage medium according to claim 2, the program causing the computer to:
   when moving the moving object on the basis of the first processing, move the moving object with a first change applied to a trajectory of the moving object; and
   when moving the moving object on the basis of the second processing, move the moving object with a second change applied to a trajectory of the moving object.

4. The computer-readable non-transitory storage medium according to claim 2, the program causing the computer to:
   execute processing of causing a character object to perform a first action with respect to the moving object, as the first processing; and
   execute processing of causing the character object to perform a second action with respect to the moving object, as the second processing.

5. The computer-readable non-transitory storage medium according to claim 1, the program further causing the computer to:
   calculate an orientation of the operation device on the basis of the operation data; and
   determine whether the operation device is swung in the upward direction or the downward direction, on the basis of the calculated orientation of the operation device.

6. The computer-readable non-transitory storage medium according to claim 5, the program further causing the computer to:
   calculate a rotation amount about the predetermined axis of the inertial sensor during the swing state, on the basis of the operation data;
   calculate an orientation change amount of the operation device during the swing state, on the basis of the operation data; and
   execute the first processing or the second processing on the basis of the rotation amount and the orientation change amount.

7. The computer-readable non-transitory storage medium according to claim 6, the program causing the computer to:

execute the first processing on the basis of a first parameter calculated by adding the rotation amount and the orientation change amount; and
execute the second processing on the basis of a second parameter calculated by adding the rotation amount and the orientation change amount.

8. The computer-readable non-transitory storage medium according to claim 7, the program causing the computer to:
for the first processing, calculate the first parameter with the orientation change amount adjusted so as to decrease; and
for the second processing, calculate the second parameter with the orientation change amount adjusted so as to decrease.

9. The computer-readable non-transitory storage medium according to claim 6, the program causing the computer to:
if the rotation amount in the first direction exceeds a first threshold, determine that the operation device is rotated in the first direction; and
if the rotation amount in the second direction exceeds a second threshold, determine that the operation device is rotated in the second direction.

10. The computer-readable non-transitory storage medium according to claim 6, the program causing the computer to:
if it is determined that the operation device is swung in the upward direction and the orientation change amount exceeds a third threshold, execute the first processing; and
if it is determined that the operation device is swung in the downward direction and the orientation change amount exceeds a fourth threshold, execute the second processing.

11. The computer-readable non-transitory storage medium according to claim 1, the program causing the computer to:
acquire operation data including acceleration data;
if a magnitude of an acceleration indicated by the acceleration data included in the acquired operation data exceeds a first threshold, determine that the swing state is started; and
at a termination timing after the magnitude of the acceleration has reached a peak, determine that the swing state is finished.

12. The computer-readable non-transitory storage medium according to claim 1, the program further causing the computer to:
execute third processing if a condition for executing the first processing and a condition for executing the second processing have not been satisfied during the swing state, on the basis of the acquired operation data.

13. An information processing apparatus including a computer, the computer being configured to:
acquire, from an operation device having an inertial sensor, operation data including at least data based on an output of the inertial sensor;
determine whether or not the operation device is in a swing state in which the operation device is being swung, on the basis of the operation data;
determine whether the operation device is rotated in a first direction about a predetermined axis of the inertial sensor or a second direction opposite to the first direction, on the basis of the operation data;
determine whether the operation device is swung in an upward direction or a downward direction, on the basis of the operation data;
execute first processing in at least a case where it is determined that the operation device is rotated in the first direction about the predetermined axis and a case where it is determined that the operation device is swung in the upward direction, during a period in which the operation device is in the swing state, on the basis of the operation data; and
execute second processing in at least a case where it is determined that the operation device is rotated in the second direction about the predetermined axis and a case where it is determined that the operation device is swung in the downward direction, during a period in which the operation device is in the swing state, on the basis of the operation data.

14. The information processing apparatus according to claim 13, the computer being further configured to:
move a moving object in a virtual space on the basis of the first processing or the second processing; and
execute game processing using the moving object.

15. The information processing apparatus according to claim 14, the computer being configured to:
when moving the moving object on the basis of the first processing, move the moving object with a first change applied to a trajectory of the moving object; and
when moving the moving object on the basis of the second processing, move the moving object with a second change applied to a trajectory of the moving object.

16. The information processing apparatus according to claim 14, the computer being configured to:
execute processing of causing a character object to perform a first action with respect to the moving object, as the first processing; and
execute processing of causing the character object to perform a second action with respect to the moving object, as the second processing.

17. An information processing method that is executed by a computer, the method comprising:
acquiring, from an operation device having an inertial sensor, operation data including at least data based on an output of the inertial sensor;
determining whether or not the operation device is in a swing state in which the operation device is being swung, on the basis of the operation data;
determining whether the operation device is rotated in a first direction about a predetermined axis of the inertial sensor or a second direction opposite to the first direction, on the basis of the operation data;
determining whether the operation device is swung in an upward direction or a downward direction, on the basis of the operation data;
executing first processing in at least either a case where it is determined that the operation device is rotated in the first direction about the predetermined axis or a case where it is determined that the operation device is swung in the upward direction, during a period in which the operation device is in the swing state, on the basis of the operation data; and
executing second processing in at least either a case where it is determined that the operation device is rotated in the second direction about the predetermined axis or a case where it is determined that the operation device is swung in the downward direction, during a period in which the operation device is in the swing state, on the basis of the operation data.

18. The information processing method according to claim 17, further comprising:

moving a moving object in a virtual space on the basis of the first processing or the second processing; and executing game processing using the moving object.

19. The information processing method according to claim 18, further comprising:

when moving the moving object on the basis of the first processing, moving the moving object with a first change applied to a trajectory of the moving object; and when moving the moving object on the basis of the second processing, moving the moving object with a second change applied to a trajectory of the moving object.

20. An information processing system comprising:

an operation device having an inertial sensor; and an information processing apparatus, the operation device being configured to transmit operation data including at least inertial data based on an output of the inertial sensor, to the information processing apparatus, the information processing apparatus being configured to:

acquire the operation data from the operation device;

determine whether or not the operation device is in a swing state in which the operation device is being swung, on the basis of the operation data;

determine whether the operation device is rotated in a first direction about a predetermined axis of the inertial sensor or a second direction opposite to the first direction, on the basis of the operation data;

determine whether the operation device is swung in an upward direction or a downward direction, on the basis of the operation data;

execute first processing in at least a case where it is determined that the operation device is rotated in the first direction about the predetermined axis and a case where it is determined that the operation device is swung in the upward direction, during a period in which the operation device is in the swing state, on the basis of the operation data; and execute second processing in at least a case where it is determined that the operation device is rotated in the second direction about the predetermined axis and a case where it is determined that the operation device is swung in the downward direction, during a period in which the operation device is in the swing state, on the basis of the operation data.

* * * * *